United States Patent
Bandyopadhyay et al.

(10) Patent No.: US 11,115,831 B1
(45) Date of Patent: Sep. 7, 2021

(54) METHOD AND APPARATUS FOR HANDLING CHANNEL TERMINATION ORDERS IN A SPECTRUM CONTROLLED NETWORK

(71) Applicant: Celona, Inc., Cupertino, CA (US)

(72) Inventors: Sourav Bandyopadhyay, Liluah Howrah (IN); Nagi Mahalingam, San Diego, CA (US); Mark Jan Dijkstra, Brooklyn, NY (US); Mehmet Yavuz, Palo Alto, CA (US)

(73) Assignee: Celona, Inc., Cupertino, CA (US)

( * ) Notice: Subject to any disclaimer, the term of this patent is extended or adjusted under 35 U.S.C. 154(b) by 0 days.

(21) Appl. No.: 16/898,263

(22) Filed: Jun. 10, 2020

Related U.S. Application Data

(60) Provisional application No. 62/896,589, filed on Mar. 6, 2020.

(51) Int. Cl.
*H04W 36/08* (2009.01)
*H04W 16/14* (2009.01)
(Continued)

(52) U.S. Cl.
CPC .......... *H04W 16/14* (2013.01); *H04W 36/08* (2013.01); *H04W 36/30* (2013.01); *H04W 52/386* (2013.01)

(58) Field of Classification Search
CPC ..... H04W 16/14; H04W 4/029; H04W 36/08; H04W 36/30
See application file for complete search history.

(56) References Cited

U.S. PATENT DOCUMENTS

2006/0234640 A1  10/2006  Hirvonen
2010/0014496 A1  1/2010  Kalika et al.
(Continued)

OTHER PUBLICATIONS

WinnForum Standards, "Signaling Protocols and Procedures for Citizens Broadband Radio Service (CBRS): Spectrum Access System (SAS)—Citizens Broadband Radio Service Device (CBSD) Interface Technical Specification". Document WINNF-TS-0016, Version V1.2.4, Jun. 26, 2019, 60 pgs.
(Continued)

*Primary Examiner* — Michael T Vu
(74) *Attorney, Agent, or Firm* — Jaquez Land Greenhaus & McFarland LLP; Bruce W. Greenhaus, Esq.

(57) ABSTRACT

A method and apparatus for handling channel termination in a spectrum-controlled wireless communication network and bringing power back up to resume normal operation. The network includes Base Stations/Access Points (BS/APs) in communication with a number of User Equipment devices (UEs) within the coverage area over wireless channels. When a channel termination order is received, the network identifies at least one BS/AP communicating on the prohibited channel and designates at least one BS/AP not transmitting on the prohibited channel which is allowed to increase transmission power. The system gradually reduces power on the impacted BS/AP and gradually increases power on the designated BS/AP to induce handoff to provide a smooth transition and avoid service interruptions to connected UEs. In one embodiment the wireless network is a Citizen's Broadband Radio Service (CBRS) network, and the BS/APs are located at an enterprise location and form part of an enterprise network.

18 Claims, 15 Drawing Sheets

(51) Int. Cl.
*H04W 36/30* (2009.01)
*H04W 52/38* (2009.01)

(56) References Cited

U.S. PATENT DOCUMENTS

| | | |
|---|---|---|
| 2010/0056163 A1 | 4/2010 | Schmidt et al. |
| 2013/0183961 A1 | 7/2013 | Bassiri et al. |
| 2015/0365833 A1 | 12/2015 | Stafford et al. |
| 2018/0132111 A1 | 5/2018 | Mueck et al. |
| 2018/0192295 A1* | 7/2018 | Mueck ................. H04W 74/04 |
| 2018/0295522 A1* | 10/2018 | Wong .................... H04W 16/14 |
| 2019/0132806 A1 | 5/2019 | Kumar et al. |
| 2019/0150134 A1 | 5/2019 | Kakinada et al. |
| 2019/0373610 A1* | 12/2019 | Cimpu ................. H04W 72/06 |
| 2019/0394678 A1 | 12/2019 | Syed et al. |
| 2020/0008007 A1 | 1/2020 | Belghoul et al. |
| 2020/0037211 A1 | 1/2020 | Hinc et al. |

OTHER PUBLICATIONS

WinnForum Standards, "Requirements for Commercial Operation in the U.S. 3550-3700 MHz Citizens Broadband Radio Service Band", Document WINNF-TS-0112, Version V1.9.1, Mar. 11, 2020, 81 pgs.
Young, Lee, International Search Report and Written Opinion received from the USRO dated May 21, 21 for appln. No. PCT/US2021/021141, 17 pgs.
Young, Lee, International Search Report and Written Opinion received from the USRO dated Jun. 2, 21 for appln. No. PCT/US2021/021158, 14 pgs.

\* cited by examiner

METHOD AND APPARATUS FOR HANDLING CHANNEL TERMINATION ORDERS IN A SPECTRUM CONTROLLED NETWORK

CROSS-REFERENCE TO RELATED APPLICATIONS—CLAIM OR PRIORITY

The present application claims priority to U.S. Provisional Application No. 62/986,589, filed Mar. 6, 2020, entitled "Method and Apparatus for Determining and Utilizing Available Spectrum in a Spectrum Controlled Network, and Handling Suspension Orders", which is herein incorporated by reference in its entirety.

BACKGROUND

Technical Field

The disclosed method and apparatus relate to wireless communication networks that include a plurality of Base Station/Access Points (BS/APs) operating wirelessly in a spectrum-controlled radio environment in which one or more channels may be terminated by a remote entity, and more particularly to methods and apparatus for efficiently terminating a channel and reconfiguring the network when a channel termination order is received from the remote entity.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE' refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

CBRS Networks

Recently, the US Federal Government finalized rules (Rule 96) that allow general access to an area of the frequency spectrum referred to as the (Citizen's Broadband Radio Service) CBRS. CBRS, which is a key element of an advanced communication network referred to as "5G", operates in a 150 MHz wide frequency range from 3.55 GHz to 3.7 GHz. The CBRS rules set forth detailed requirements for the devices that operate in a CBRS network and how they communicate. CBRS supports both LTE and 5G devices. Base stations within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR). For CBSDs that comprise multiple nodes or networks of nodes, CBSD requirements apply to each node, even if network management and communication with the SAS is accomplished via a single network interface.

The CBRS rules require that a Spectrum Access System (SAS) allocate spectrum to the CBSDs to avoid interference within the CBRS band. The Spectrum Access System (SAS) is a service, typically cloud-based, that manages the spectrum used in wireless communications of devices transmitting in the CBRS band in order to prevent harmful interference to higher priority users, such as the military and priority licensees.

A CBRS device (CBSD) needs authorization from the SAS before starting to transmit in the CBRS band. Generally, the SAS authorizes and manages use of spectrum for the CBRS. More specifically, the SAS maintains records of all authorized services and CBSDs in the CBRS frequency bands, is capable of determining the available channel at a specific geographic location, provides information on available channels to CBSDs that have been certified under the Commission's equipment authorization procedures, determines and enforces maximum power levels for CBSDs, enforces protection criteria for Incumbent Users and Priority Access Licensees, and performs other functions as set forth in the Federal Communications Commission (FCC) rules.
Communications and Messaging Between the CBSDs and the SAS Each CBSD in the network must follow the direction provided by the SAS, as per the rules, in order to operate within a CBRS network and avoid interference with other CBSDs outside the network, as well as to prevent interference with nearby Priority Access License (PAL users) and military activities in the CBRS band. To maintain communication between the CBSDs and the SAS, a series of messages are exchanged between the SAS and the CBSD (or Domain Proxy). These message exchanges are for purposes including registration, spectrum inquiry, grant, and heartbeat response. The messages may be exchanged directly between each CBSD and the SAS; however, when a network includes multiple CBSDs, a Domain Proxy (DP) may be implemented. A DP is a unit that represents one or more CBSD(s) to the SAS.

FIG. 2 is a block diagram that shows a Domain Proxy 201 connected between a plurality of CBSDs 203 and an SAS 207. When a Domain Proxy is implemented, it manages all transactions between the CBSDs and the SAS by proxying the messages and facilitating functions such as channel arbitration, proxied heartbeat responses, and so forth. In other works, in a network that has multiple CBSDs 203, the DP 201 is connected to each of the CBSDs to act as a proxy for all SAS transactions and conveys all messages pertaining to the SAS-CBSD interface 209 for client CBSDs 203. Accordingly, the DP 201 presents a consistent and secure interface to the SAS 207, and in large enterprise deployments, a DP 201 may be deployed to minimize the high count of SSL/TLS connections that would otherwise be required for individual CBSDs. In some cases, CBRS rules do allow an individual CBSD, such as the CBDS 205, to communicate directly with the SAS 207.

The Spectrum Sharing Committee Work Group 3 (for CBRS Protocols) has established an interface specification for registering a CBSD with an SAS, requesting a grant of spectrum, and maintaining that grant. These message flows are described in the document titled "Signaling Protocols and Procedures for Citizens Broadband Radio Service (CBRS): Spectrum Access System (SAS)-Citizens Broadband Radio Service Device (CBSD) Interface Technical Specification", Document WINNF-TS-0016-V1.2.4. 26 Jun. 2019.

Registering a CBSD with the SAS requires certain information, including the CBSD's EIRP (Effective Isotropic Radiated Power), which is the measured radiated power of an antenna in a specific direction. As per the current 5G specification, based upon the announced EIRP, the class of the CBSD, and other information, the SAS may admit or reject a request. The announced EIRP is one among many admission criteria. After a successful registration with the SAS, (i.e., after the CBSD is admitted), the CBSD can inquire with the SAS to check for spectrum availability with a spectrum inquiry procedure. In its response to the spectrum inquiry, the SAS indicates availability of channels and the associated maximum EIRP allowed on each of those available channels. Since the SAS is the primary spectrum arbitrating entity, the SAS must have knowledge of CBSD locations and/or measurements of channels (e.g., RSSI scans) on one or more channels in the vicinity of the CBSD.

For example, if a CBSD #1 registers with the SAS, indicating its EIRP capability as X dBm, the SAS may deem CBSD #1 as capable of causing interference to other CBSDs (#2, . . . #n) that the SAS knows to be operational in that vicinity (i.e., already registered and operational on certain channels). To address this problem, and limit interference on the channels that are already in use by other CBSDs (#2, . . . , #n) the SAS may indicate those channels as "unavailable". The SAS may typically make these determinations based on propagation modeling and other empirical methods implemented.

Before and during the registration process, the CBSD (or DP) conventionally doesn't know how much power is available on each channel, so it registers with an intended power. It is only after a spectrum inquiry that the CBSD can know for sure if the spectrum is available or not. If the CBSD registers with a high power, then when spectrum is requested, the request may be denied if the spectrum is unavailable at that high power. However, if during registration CBSD #1 would have indicated its intention to transmit at a lesser power Y dBm (e.g., Y=X−3), the SAS would have been able to determine that CBSD #1 would not interfere with the other CBSDs (#2 . . . #n) on some or all of the channels that were indicated as unavailable earlier when registration indicated EIRP capability as "X". However, if a lesser power is requested first, then there is the possibility that it could have registered at a higher power which would provide broader and better coverage.

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

Once channels authorized (granted) and the system is operating, the spectrum controlling entity (the SAS in the CBRS system) may need to suspend or terminate operations on one or more channels in order to accommodate higher priority users, for example. In such a circumstance, after a termination order is received, any BS/APs transmitting on the prohibited channel must stop transmitting within a specified time period. In order to maintain connectivity for any UEs connected to the impacted BS/APs, communication must be transferred to another BS/AP before transmissions on that channel cease. Accordingly, following a channel termination, there is a need for a smooth transition of any UEs that may be connected to the impacted BS/APs to another BS/AP.

SUMMARY

Enterprises have been moving towards digital solutions and this includes optimization of compute, storage and networking infrastructure for optimal performance of their business applications within their business location. For this purpose, wireless network systems are being developed to make effective use of the spectrum within a business enterprise for wireless communication, in order to improve communication capabilities within the organization and between the organization and the external entities. These improved communication capabilities can increase business efficiency and reduce costs.

One type of wireless network that has recently become available for general use within business enterprise locations is a CBRS network, which utilizes the CBRS radio band of 3550-3700 MHz, nominally divided into fifteen channels of 10 MHz each. In order to make this spectrum available, however, certain prior users (including the military) have been given a higher priority to access the spectrum. In order to implement this system, and ensure that certain users are given higher priority, use of this radio band is subject to spectrum control by a Spectrum Access System (SAS). Any enterprise implementing a CBRS network must follow the directions given by the SAS, such as which channels it can use and how much power it can transmit. In some instances, previously authorized channels may be suspended (temporary suspension of grant) or fully terminated (permanent termination of grant) by the SAS, and the CBRS network is given a fixed period of time (sixty seconds currently) to terminate transmissions on that channel.

Various embodiments of a wireless communication network operating in a spectrum-controlled radio band are disclosed.

In one implementation, a wireless communication network that uses a spectrum-controlled radio band such as CBRS includes an apparatus for handling a channel termination order received from a spectrum access system (SAS). The wireless communication network includes a plurality of Base Stations/Access Points (BS/APs) located within an area, and the BS/APs can communicate with a number of User Equipment devices (UEs) within the coverage area over a plurality of wireless channels. The channel termination order from the SAS is received by a domain proxy, and the order identifies a prohibited channel. All communications over this prohibited channel must be terminated within a time period. The apparatus includes a domain proxy connected to the SAS and the BS/APs and is configured to communicate with the SAS and the BS/APs and particularly receive the channel termination order. The apparatus also includes an Automatic Configuration Server (ACS) connected to the domain proxy and the BS/APs. The ACS is configured to manage operations of the BS/APs. The ACS is also configured to identify at least one BS/AP that is communicating on the prohibited channel and therefore is impacted by the channel termination order, designate at least one of the BS/APs that is not transmitting on the prohibited channel, and is allowed to increase transmission power, gradually reduce the transmission power on the at least one impacted BS/AP during the time period to induce impacted UEs connected to the impacted BS/AP to handoff to a non-impacted BS/AP, and gradually increase the transmission power of the at least one designated BS/AP to receive a handoff from at least one of the impacted UEs. Therefore, during this time period and before all transmission on the prohibited channel must cease, the impacted UEs previously communicating with the impacted BS/AP can change communication from the impacted BS/AP to the designated BS/AP.

In one embodiment, the apparatus includes a Self-Organizing Network (SON) unit connected to the domain proxy, the ACS and the BS/APs In this embodiment the SON unit is configured to define a plurality of primary BS/APs that collectively provide wireless coverage substantially over the entire area, and that are authorized to transmit at higher power than other available channels. In this embodiment the ACS is configured to designate at least one of the primary BS/APs to gradually increase the transmission power on a non-impacted channel.

An embodiment is also disclosed to bring power back up on the previously-impacted BS/AP to resume normal operation. In this embodiment the domain proxy is configured to receive authorization for transmission on a channel, and the ACS is configured, subsequent to handoff of impacted UEs, to direct the previously impacted BS/AP to transmit on the authorized channel and increase the transmission power of the authorized channel, and to direct the primary BS/AP to decrease transmission power, to induce UEs to handoff from the primary BS/AP to the previously impacted BS/AP which is currently transmitting on the authorized channel.

In one embodiment, the wireless network is configured to operate in the Citizen's Broadband Radio Service (CBRS) radio band, the BS/APs comprise CBRS Devices (CBSDs) that are located at an enterprise location and form part of an enterprise network. The area in which the BS/APs are installed may comprise a floor space within an enterprise location, and the BS/APs define at least part of an enterprise network.

A method is disclosed to respond to a channel termination order received by a wireless communication network. The network includes a plurality of Base Stations/Access Points (BS/APs) located within an area, and the BS/APs communicate with a plurality of User Equipment devices (UEs) on a plurality of wireless channels. The method includes the steps of receiving a termination order that identifies a prohibited channel, thereby requiring the wireless network to terminate communication on the prohibited channel within a time period, identifying at least one BS/AP that is communicating on the prohibited channel and therefore is impacted by the channel termination order, designating at least one of the BS/APs that is not transmitting on the prohibited channel, and is allowed to increase transmission power, gradually reducing the transmission power on the at least one impacted BS/AP during the time period to induce impacted UEs connected to the impacted BS/AP to handoff to a non-impacted BS/AP; and gradually increasing the transmission power of the at least one designated BS/AP to receive a handoff from at least one of the impacted UEs. Therefore at least one impacted UEs previously communicating with the impacted BS/AP changes communication from the impacted BS/AP to the designated BS/AP.

In some embodiments the step of designating at least one BS/AP that is not transmitting on a prohibited channel further comprises designating at least one of a plurality of primary BS/APs that collectively provides wireless coverage substantially over the entire area, and that are authorized to transmit at higher power than other available channels; and the step of gradually increasing the transmission power includes increasing the transmission power of at least one of the primary BS/APs. Advantageously, designating a primary BS/AP to receive handoffs can be advantageous for system performance in this situation.

A method is also disclosed to bring power back up on the previously impacted BS/AP, and down on the primary BS/AP to resume normal operation. In one embodiment of this method, subsequent to handoff of the impacted UEs, the system receives authorization for transmission on a channel, and directs the previously-impacted BS/AP to transmit on the authorized channel. The transmission power on the authorized channel on the previously impacted BS/AP is gradually increased while gradually decreasing the transmission power of the at least one primary BS/AP. As a result, the previously-impacted UEs are induced to handoff from the primary BS/AP to the previously impacted BS/AP, which is now transmitting on the newly-authorized channel.

In some embodiments the wireless network operates on the Citizen's Broadband Radio Service (CBRS band), the BS/APs comprise CBRS Devices (CBSDs) that are located at an enterprise location and form part of an enterprise network, a Spectrum Access System (SAS) provides the channel termination order, and the channel termination order is one of a suspension order and a termination order. In the CBRS embodiment the time period is predetermined, and at least one of the UEs previously connected to the impacted BS/AP transfers communications to the designated BS/AP during the predetermined time period, substantially without interruption in service.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) 4G and 5G Communication Networks and Systems

Communication networks and system components are described herein using terminology and components relating to CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network.

(2) Enterprises and Enterprise Networks

An implementation in the context of an enterprise network is described herein. Although described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(3) Communication Network

Figure 1:
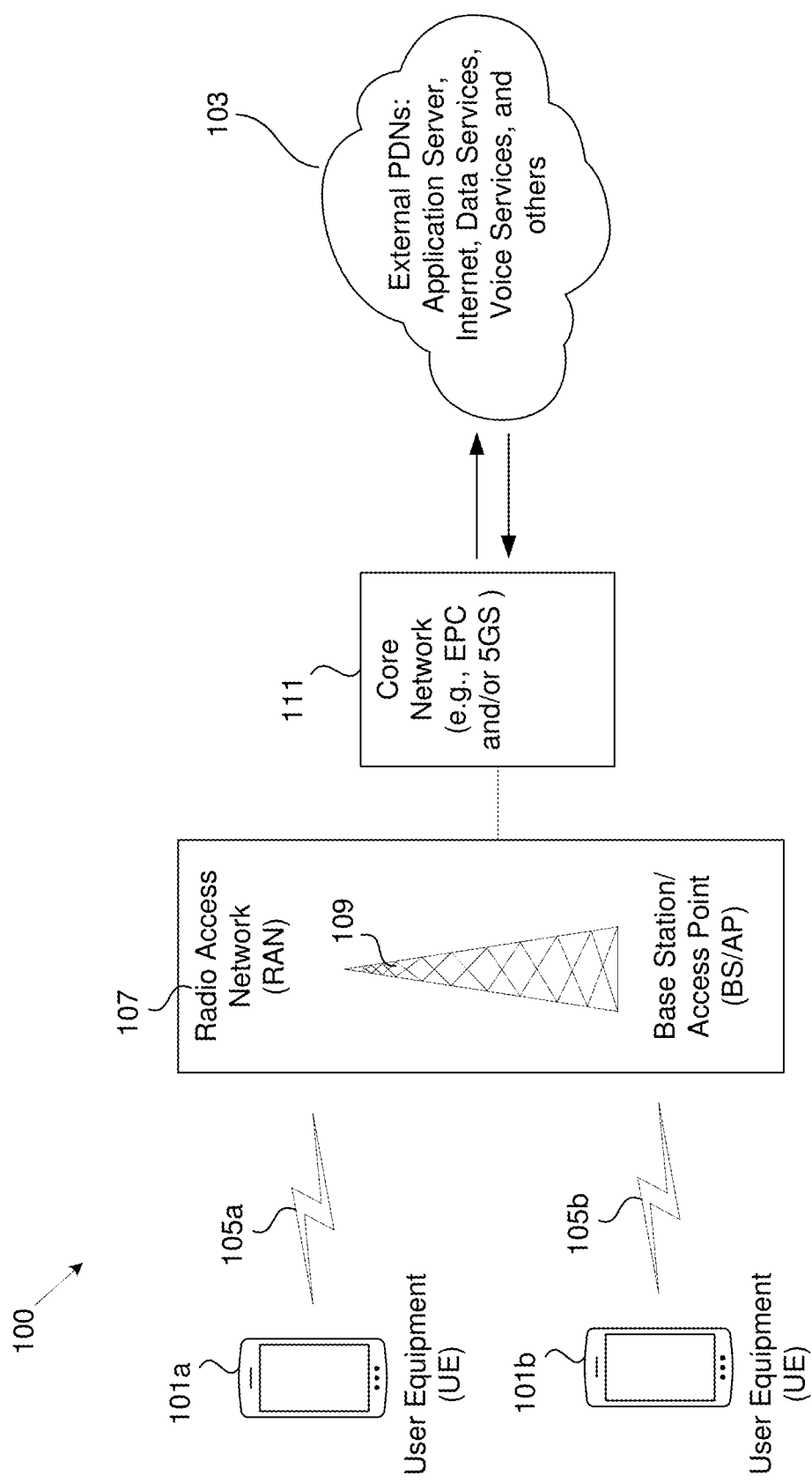
FIG. 1 is an illustration of a basic configuration for a communication network, such as a "4G LTE" (fourth generation Long-Term Evolution) or "5G NR" (fifth generation New Radio) network.
Figure 2:
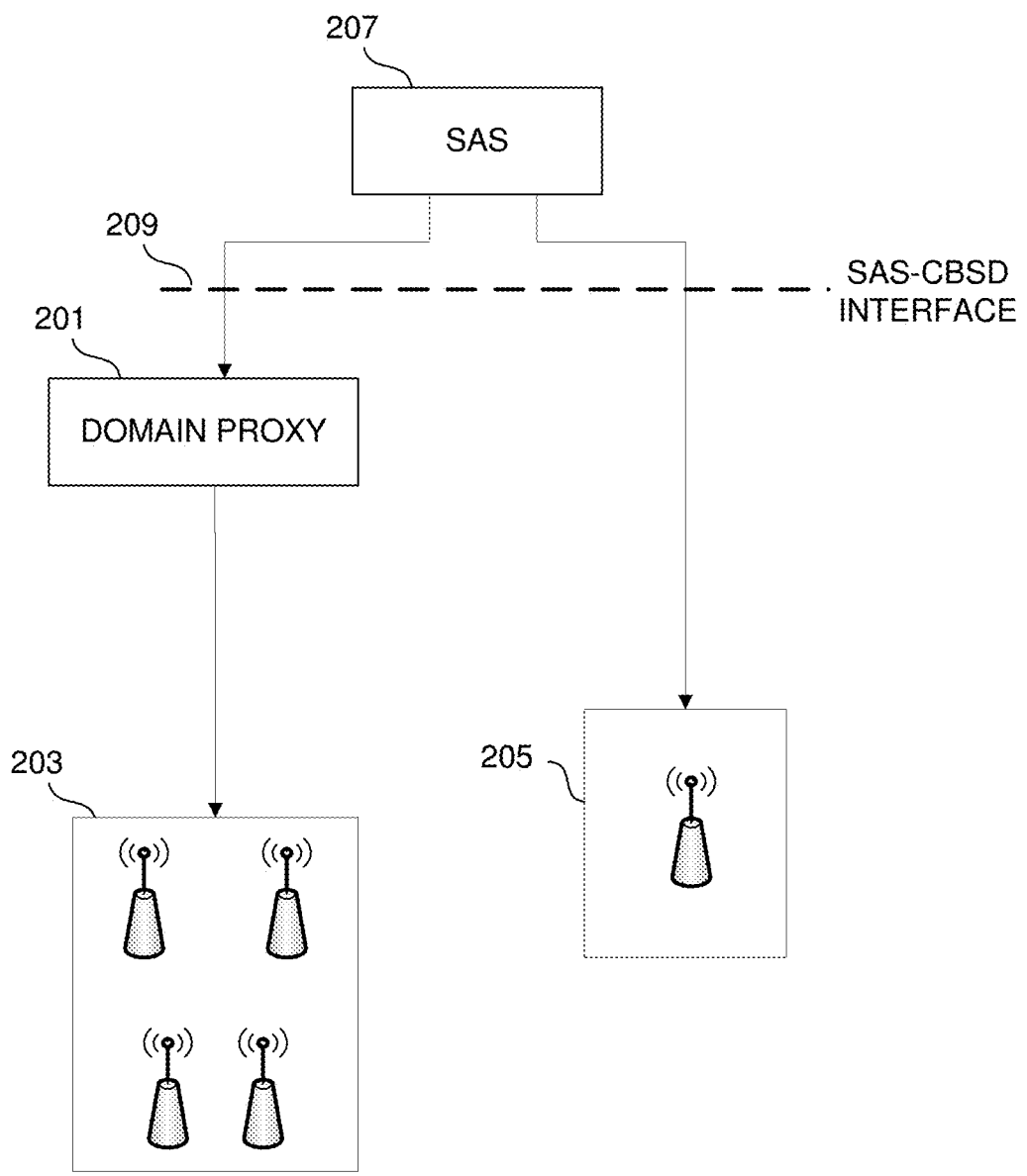
FIG. 2 is a block diagram of a communication network showing a Domain Proxy connected between a plurality of CBSDs and an SAS.
Figure 3:
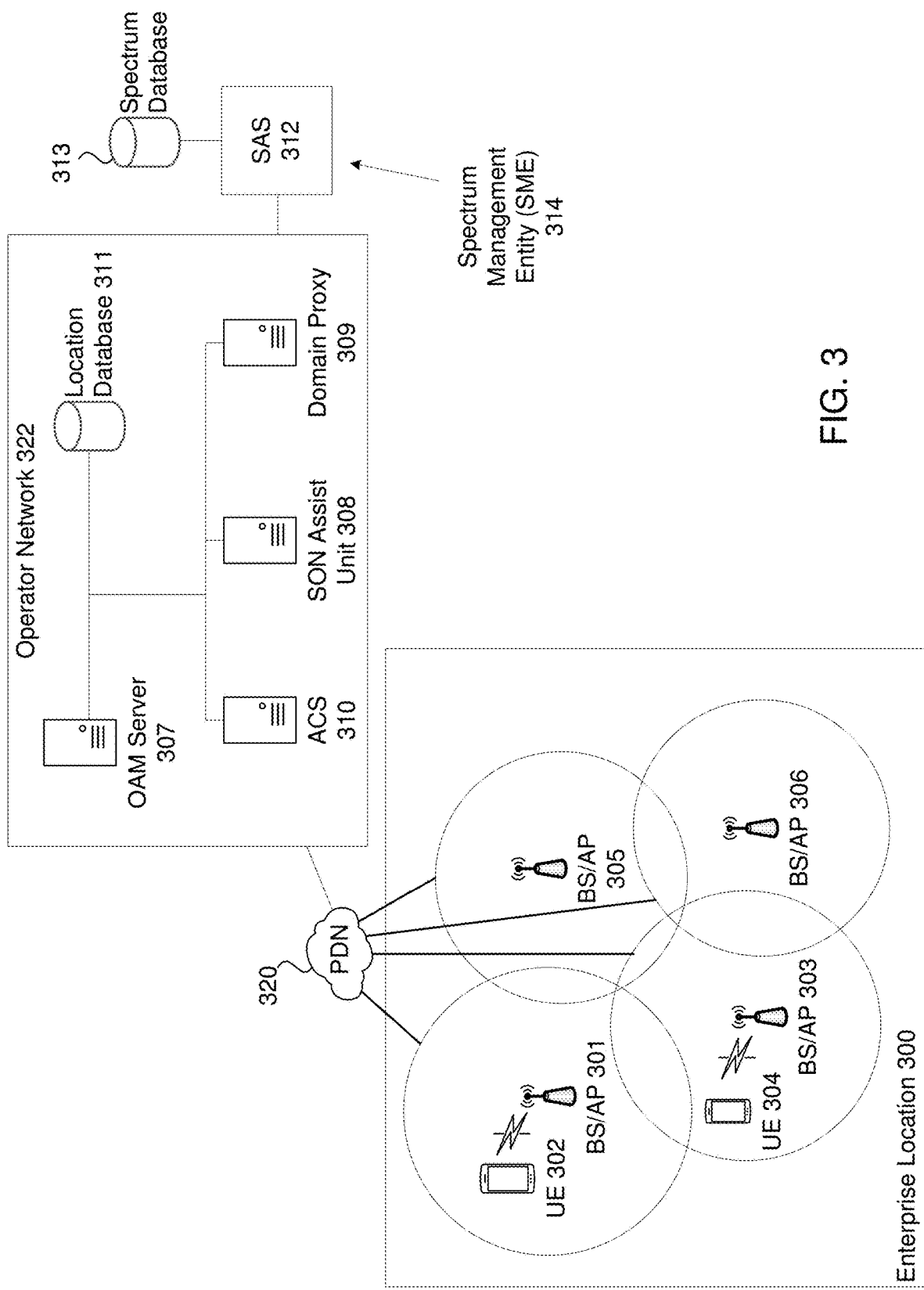
FIG. 3 is a diagram of a wireless communication network including an operator network connected to a Spectrum Management Entity (SME) and an enterprise network including a plurality of BS/APs deployed within an enterprise location.

Reference is now made to FIG. 3, which is a diagram of a wireless communication network in which the system described herein can be implemented. A plurality of BS/APs 301, 303, 305, 306 are deployed in an enterprise location 300. In FIG. 3, each BS/AP has a range represented by the circle, which approximately represents its wireless coverage. The BS/APs may be CBSDs in a CBRS systems. A first UE 302 is wirelessly connected to a first BS/AP 301, which is providing service to it. A second UE 304 is wirelessly connected to a second BS/AP 303, and is providing service to that second UE 304. All the BS/APs are connected to a PDN 320 by any appropriate communications means, such as wire, fiber optic, and wireless radio. The PDN 320 provides a connection to an operator network 322 that includes an OAM Server 307, a SON assist unit 308, a Domain Proxy 309, an Automatic Configuration Server (ACS) 310 and a Location Database 311, all of which are connected to each other within the operator network 322 by any appropriate means. The operator network is connected to an SAS 312, which is connected to a Spectrum Database 313 that includes data regarding the spectrum that it is managing. Collectively, the SAS 312 and the Spectrum Database 313 are referred to as a Spectrum Management Entity (SME) 314.

According to the IETF definition of OAM (RFC 6291 definition) the components of the "OAM" acronym are defined as follows:

Operations—Operation activities are undertaken to keep the network (and the services that the network provides) up and running. It includes monitoring the network and finding problems. Ideally these problems should be found before users are affected.

Administration—Administration activities involve keeping track of resources in the network and how they are used. It includes all the bookkeeping that is necessary to track networking resources and the network under control.

Maintenance—Maintenance activities are focused on facilitating repairs and upgrades—for example, when equipment must be replaced, when a router needs a patch for an operating system image, or when a new switch is added to a network. Maintenance also involves corrective and preventive measures to make the managed network run more effectively, e.g., adjusting device configuration and parameters.

FIG. 3 is one example of a wireless communication network in which the system described herein can be implemented; other implementations are possible.

(4) Dimensioning Process

A method of dimensioning a plurality of BS/APs is described herein. As used herein, "dimensioning" a plurality of BS/APs includes determining where to position the network BS/APs within a fixed area in order to effectively provide wireless network coverage throughout an area. In other words, dimensioning provides the UEs throughout the area with network access wirelessly to at least one BS/AP. Herein the area may be referred to as an enterprise location and the network may be referred to as an enterprise network, but the area can be at any location, and the network need not be specific to an enterprise.

The term EIRP (Effective Isotropic Radiated Power) is used herein. EIRP is the measured radiated power of an antenna in a specific direction. EIRP may be represented in a logarithmic scale. For purposes of description herein, a value (H) is the highest EIRP that a BS/AP is capable of transmitting, and a value (L) is the lowest EIRP that the BS/AP is capable of transmitting. The terms highest EIRP (H) and lowest EIRP (L) correspond to the limits defined by the class of each of the BS/APs and the choice of electronic components (such as the power amplifiers) used in each of the BS/APs.

Figure 4:
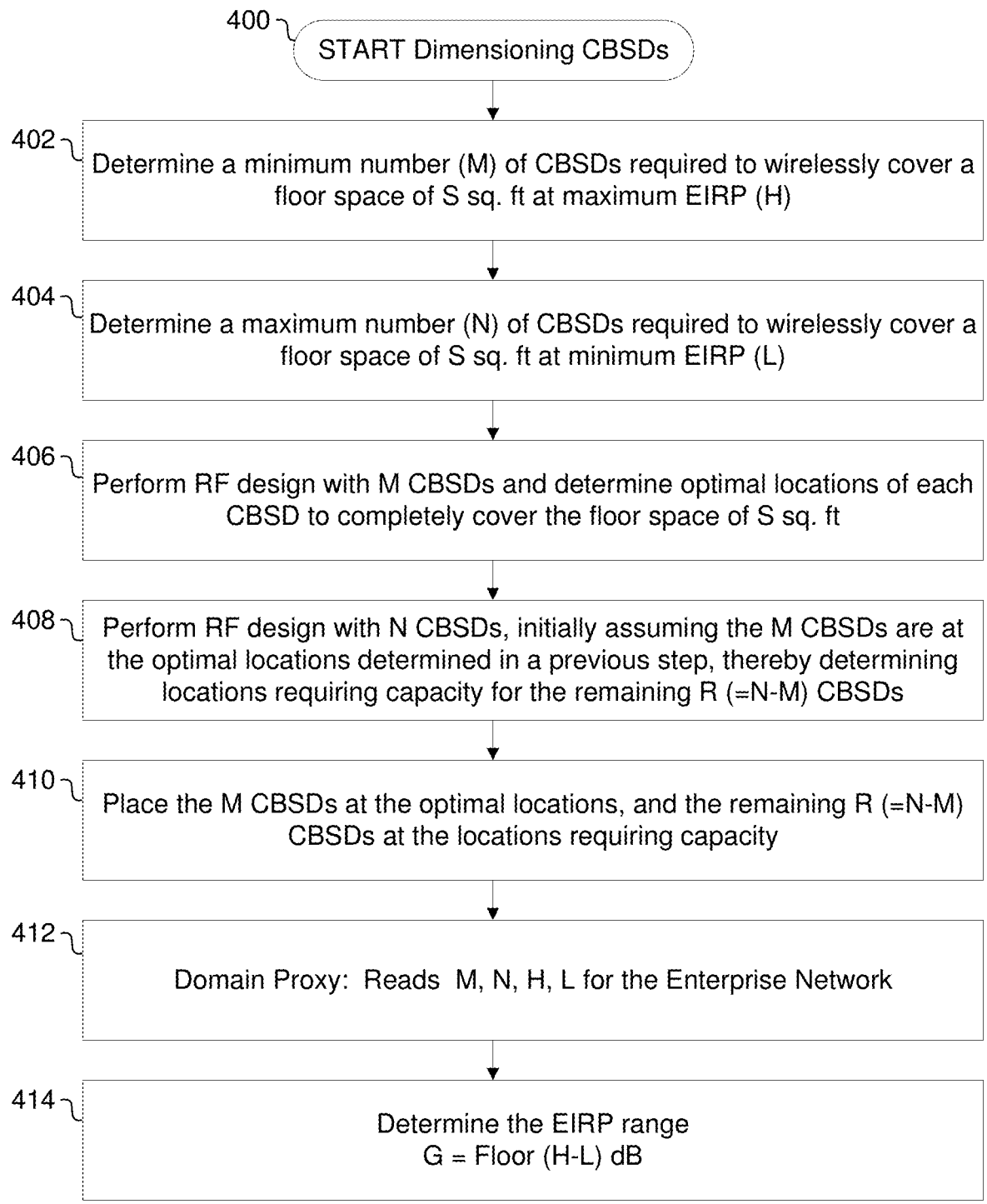
FIG. 4 is a flow chart showing operations of the dimensioning process.

Reference is made to FIG. 4, which is a flow chart of operations of the dimensioning process, in which the positions of the BS/APs in an area (e.g. an enterprise location) are determined, and the BS/APs are installed in position within the area.

After operation begins (STEP 400), the first step (STEP 402) is to determine the minimum number (M) of BS/APs needed to wirelessly cover the entire area, assuming all BS/APs are transmitting at their highest EIRP (=H), which may be termed the "primary" BS/APs. For this first step at least the square footage of the area is taken into account. In addition, any obstacles or environmental factors (e.g., walls, or other barriers) and other factors that may affect wireless signals in the area may be taken into account. This first step may be done with a network planner such as iB-Wave (https://www.ibwave.com) or an empirical method, for example.

The next step (STEP 404) is to determine the maximum number of BS/APs (N) required to wirelessly cover the entire area if all N BS/APs are transmitting at lowest EIRP (=L). This group of BS/APs may be called the "supplemental" BS/APs. As above, this step may be performed with a network planner such as iB-Wave (https://www.ibwave.com) or an empirical method, for example, taking into account at least the square footage of the area. Obstacles, environmental factors, and other factors that may affect wireless signals in the area may also be considered.

In the next (STEP 406), the M primary BS/APs determined previously (STEP 402) are positioned within the area to provide wireless coverage of the entire area. Preferably, the positioning of the primary BS/APs is selected so that these M BS/APs provide optimal coverage of the entire area. In this context, an optimal coverage may be a "best fit" placement of the M primary BS/APs, and may assume that each BS/AP is transmitting at its maximum (H) EIRP. The placement of the M primary BS/APs may be accomplished using any appropriate technique, such as simulations, and/or sound RF design principles, or by using an RF design tool. For example, a common deployment principle calls for more than 95% coverage at an RSRP (Reference Signal Received Power) of −95 dBm or better. Using this design criteria as one example, the M primary BS/APs may be determined.

Figure 5:
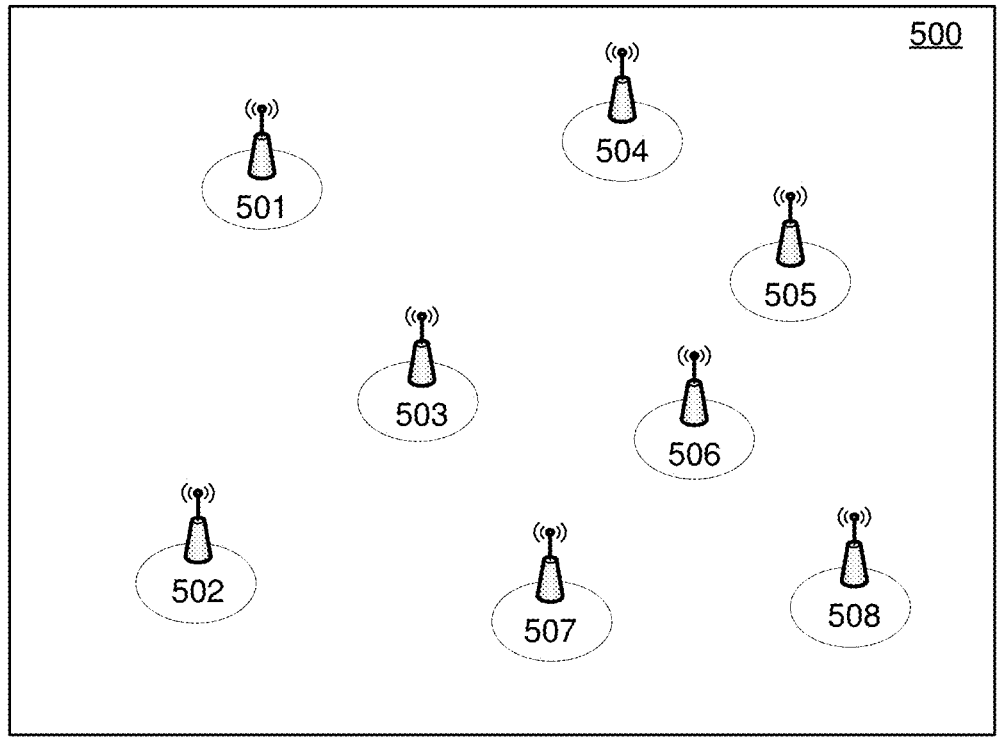
FIG. 5 is a diagram showing an enterprise location and a plurality of BS/APs installed within the enterprise location, showing an example of positioning the BS/APs within the enterprise location.

Reference is briefly made to FIG. 5, which is a diagram showing an enterprise location 500 and a plurality of BS/APs installed within the enterprise location, showing an example of positioning the M BS/APs within the enterprise location 500. Particularly, FIG. 5 shows an example of positioning of the M (=8) BS/APs 501, 502, 503, 504, 505, 506, 507, 508, at optimal positions to wirelessly cover the entire area of the enterprise location 500. In this example, there are eight (8) primary BS/APs, so the minimum number M=8. The enterprise location 500 includes a floor space that may be coextensive with the enterprise location 500, and the BS/APs may be placed within the floor space.

Referring back to FIG. 4, in the next step (STEP 408), assuming that placement of all M BS/APs in the previous step (STEP 406) is complete, the remaining R (=N-M) supplemental BS/APs are then placed at appropriate locations within the network coverage area to augment capacity of the primary BS/APs, as required or useful within the enterprise. Preferably the supplemental BS/APs are positioned to provide optimal coverage (i.e., at "optimal" locations). An optimal coverage may be a "best fit" placement of the R supplemental BS/APs given the positions of the M primary BS/APs, and may assume that each BS/AP is transmitting at its maximum (H) EIRP. The positioning of the R supplemental BS/APs is accomplished using any appropriate technique, such as simulations, and/or sound RF design principles, or by using an RF design tool.

Now that all N BS/APs (primary and supplemental) are placed, we can observe that the enterprise location could be covered satisfactorily with only the M primary BS/APs 501 to 508. The remaining R supplemental BS/APs simply provide increased capacity once they are placed at appropriate locations. For example, supplemental BS/APs may be placed near the common areas such as a café or conference rooms where increased traffic may be expected.

Figure 6:
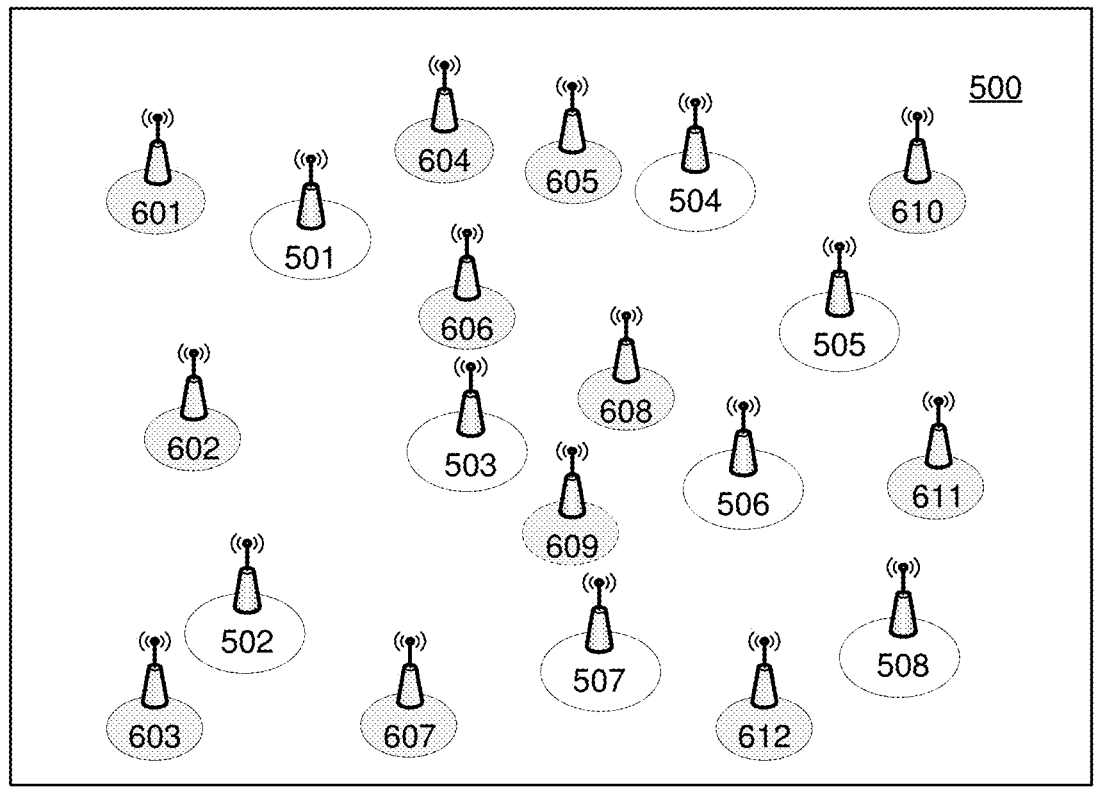
FIG. 6 is a diagram showing the enterprise location as in FIG. 5, showing the minimum number (M) of BS/APs as in the example of FIG. 5, and also showing an example installation of supplemental BS/APs.

Reference is briefly made to FIG. 6, which is a view of the enterprise location 500, showing the minimum number (M) of BS/APs as in the example of FIG. 5, and also showing an example placement of R supplemental BS/APs. In this example, twelve supplemental BS/APs are shown (R=12), and therefore the total number of BS/APs in the enterprise location is twenty (N=20). FIG. 6 shows an example positioning of the R (=12) BS/APs 601, 602, 603, 604, 605, 606, 607, 608, 609, 610, 611, 612 at positions to augment capacity for the wireless network at the enterprise location 500. Note that the additional R supplemental BS/APs provide flexibility, because after these supplemental BS/APs are in place, the M primary BS/APs 501, . . . , 508 need not transmit at the highest available power (H) and can transmit at a lower power than (H) even if some or all of the other BS/APs transmit at a lower power (L).

Referring back to FIG. 4, the next step (STEP 412) is to provide the values M, N, H and L at the Domain Proxy by any suitable mechanism, before (or during) the registration process described herein. Thus, these values are known to the Domain Proxy before (or during) the registration process. For example, a secure HTTPs-based UI (or an API) from the customer site to the Domain Proxy software may provision this information. Alternatively, the OAM server may receive this information from the BS/APs during the bootstrapping procedure, and subsequently provision them at the DP. In the next step (STEP 414), the Domain Proxy determines the range (H-L) in dB before commencing registration sequences with the SAS.

(5) Summary of Dimensioning

In one embodiment, the wireless communication network comprises a plurality of BS/APs installed within an area such as an enterprise location or a floor space within an enterprise location. The wireless communication network may be a spectrum-controlled network such as a Citizen's Broadband Radio Service (CBRS) network, and the BS/APs comprise CBRS devices (CBSDs). In the CBRS network embodiment, a domain proxy may be connected to communicate with an SAS on behalf of the CBSDs.

Each of the BS/APs in the wireless communication network has a maximum EIRP and a minimum EIRP. The plurality of BS/APs includes a maximum number (N) of BS/APs required to provide wireless radio coverage substantially over the entire area at the minimum EIRP of the BS/APs. The N BS/APs include a primary group of BS/APs and a supplemental group of BS/APs. The primary group of BS/APs includes a minimum number (M) of BS/APs needed to provide wireless radio coverage over substantially the entire area at the maximum EIRP for the BS/APs. The M primary BS/APs are positioned within the area so that substantially the entire area is wirelessly covered by the primary group.

The supplemental group of BS/APs includes the remaining BS/APs of the plurality of N BS/APs; this remainder R is defined as the difference between the N BS/APs and the M primary BS/APs. The supplemental BS/APs are positioned responsive to the known placement of the primary BS/APs to provide additional coverage within the area.

Preferably, the primary group of BS/APs is installed at optimal locations using an appropriate dimensioning system, and the supplemental group of BS/APs is installed to provide additional coverage at locations requiring capacity.

A method of providing the wireless communication network is disclosed, including steps for dimensioning a plurality of BS/APs and placing them within an area of a wireless network. Each of the BS/APs has a maximum EIRP and a minimum EIRP, and the steps include first defining a primary group of BS/APs and determining their placement, and second defining a supplemental group of BS/APs and determining their placement. To define the primary group of BS/APs, a minimum number (M) of BS/APs needed to provide wireless radio coverage over substantially the entire area at the maximum EIRP for the BS/APs is determined. This, minimum number defines the M primary BS/APs. Placement locations are then determined for the primary BS/APs within the area, so that substantially the entire area is wirelessly covered by the primary BS/APs. The primary BS/APs may then be installed at the determined locations.

To define the supplemental group of BS/APs, a maximum number (N) of BS/APs required to provide wireless radio coverage substantially over the entire area at the minimum EIRP for the N BS/APs is determined. A remainder (R) of supplemental BS/APs is defined as the difference between the maximum number (N) and the number (M) of primary BS/APs. Responsive to the placement of the primary BS/APs at the determined locations, additional locations are determined, to place the R supplemental BS/APs to provide additional coverage.

In an embodiment in which the BS/APs comprise CBSDs, the wireless network is a spectrum-controlled (e.g. CBRS) network, and a domain proxy is connected to communicate with an SAS on behalf of the CBSDs, the N CBSDs are then registered by the domain proxy with the SAS.

(6) Registration, Spectrum Inquiry and Mapping, and Channel Allocation

Figure 7:
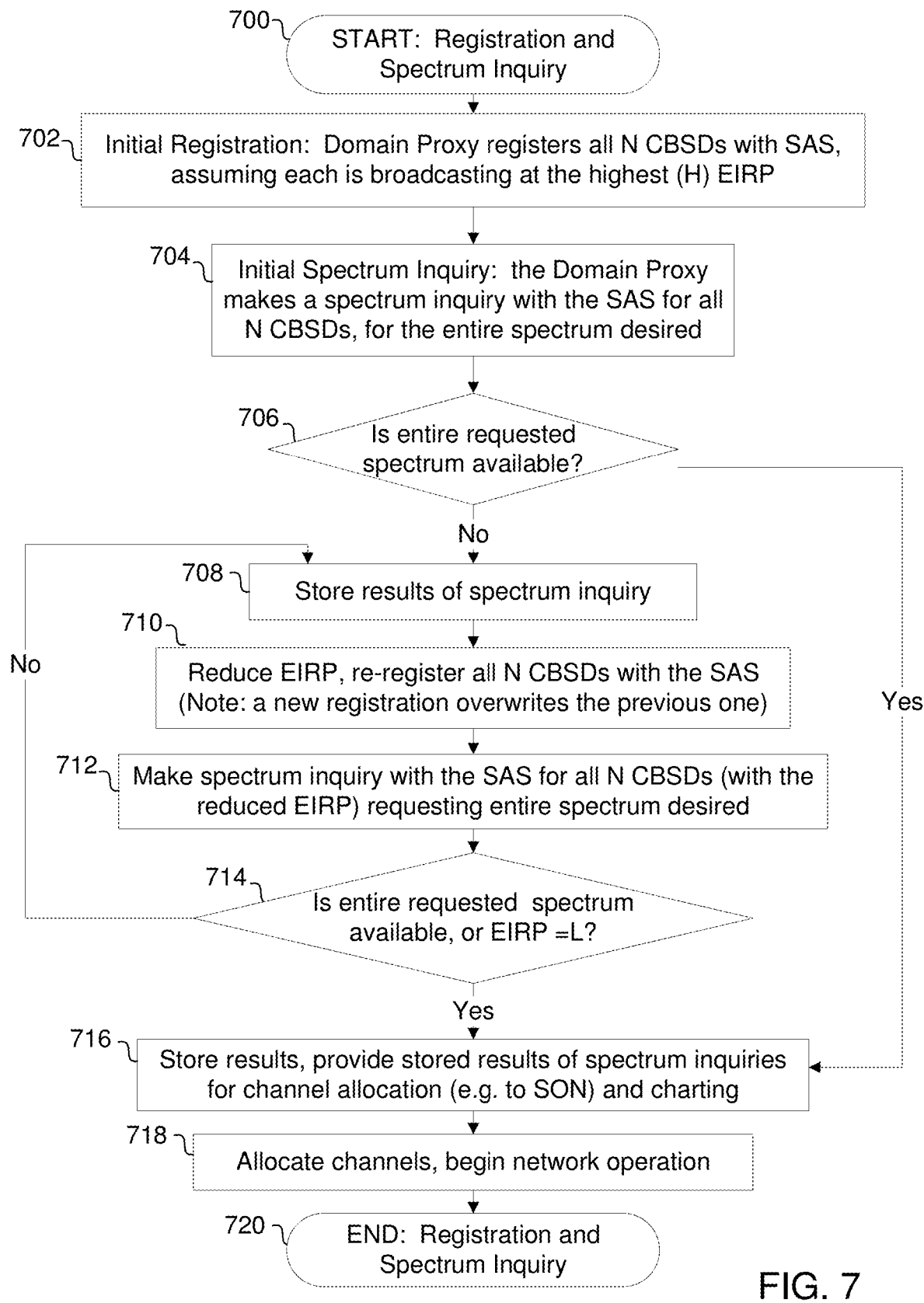
FIG. 7 is a flowchart of steps to iteratively register and make spectrum inquiries for the purpose of mapping the available spectrum and allocating channels to the BS/APs in the enterprise network.

Reference is now made to FIG. 7 which is a flowchart of steps to iteratively register and make spectrum inquiries for the purpose of mapping the available spectrum and allocating channels to the BS/APs in the enterprise network. The registration and spectrum inquiries are typically made by the Domain Proxy 309 (FIG. 3) on behalf of all the BS/APs in the enterprise network. The Domain Proxy 309 exchanges messages with the SAS 312 in accordance any with applicable communication standards such as those related to CBRS.

After starting operations (STEP 700) the Domain Proxy performs an initial registration (STEP 702), during which the Domain Proxy registers the full complement of N BS/APs. In the registration process, the SAS is provided with all information required by the SAS, which includes the EIRP of each BS/AP. In the initial registration, the EIRP capability for each BS/AP is indicated at the highest (H) power, typically in dBm units.

In the registration flow, the Domain Proxy also indicates to the SAS the location information for each of the BS/APs. This location information can be obtained in accordance with the BS/AP placement steps described herein, and with reference to FIGS. 4, 5 and 6. Alternatively other sources of location information can be utilized, such as the actual known location reported by the BS/AP, assuming it has been physically installed at the enterprise location, or an estimate.

Following successful registration, the Domain Proxy invokes the initial spectrum inquiry procedure (STEP 704) to inquire regarding availability of the entire spectrum desired, which typically is the entire spectrum in a band. For example, 150 MHz has been approved in Band48 currently for CBRS systems, and therefore the availability of the entire 150 MHz spectrum may be requested. However, in other embodiments, depending upon the implementation, the entire spectrum desired may be less than an entire band.

At the next step (STEP 706), the results of the spectrum inquiry (STEP 704) are reviewed, and in the unlikely event that the SAS indicates that the desired spectrum is available at the highest possible EIRP (H), then operation ends (STEP 720), because the entire requested spectrum is available, and no further iterations are necessary.

However, in the more likely event that the initial spectrum inquiry (STEP 704) from the SAS indicates that the available spectrum is less than what was requested (STEP 706), then generally the Domain Proxy begins an iterative procedure of re-registering the N BS/APs at a lower EIRP, and then making a spectrum inquiry to determine the channels at which the SAS might indicate increased availability of channels at the lower EIRP. The EIRP capability is progressively (iteratively) decreased from (H) to (L) dBm, in predetermined steps (1 dB equal steps, for example) until the SAS indicates that the entire spectrum is available at the re-registered EIRP value for that iteration, at which point no further iterations are necessary.

More specifically, if the initial spectrum inquiry (STEP 704) indicates that the entire requested spectrum is not available (STEP 706), then an iterative process begins in which the results of the previous spectrum inquiry are stored (STEP 708). In the next step (STEP 710), the EIRP is reduced, and all N BS/APs are re-registered with the SAS. In this process the previous registration will be overwritten whenever a new registration is requested, in accordance with current SAS operational rules for CBRS.

After registration with the reduced EIRP, the Domain Proxy makes a spectrum inquiry (STEP 712) on behalf of all the BS/APs, requesting the entire spectrum desired, as in the initial spectrum inquiry (STEP 704).

The response from the SAS is reviewed (STEP 714), and if the entire requested spectrum is not yet available, then operation returns to store the results (STEP 708) and continues iteratively reducing the EIRP (STEP 710) and making a spectrum inquiry (STEP 712).

When the entire requested spectrum is available (STEP 714) or the current EIRP=L (i.e. the most recent EIRP is the lowest available transmission power L), then results are stored, and all the stored results are provided for spectrum mapping and channel allocation purposes (STEP 716). In the next step, (STEP 718) channels are allocated to the BS/APs by e.g. a Self-Organizing Network (SON) 308 (FIG. 3) described in more detail elsewhere herein.

Figure 8:
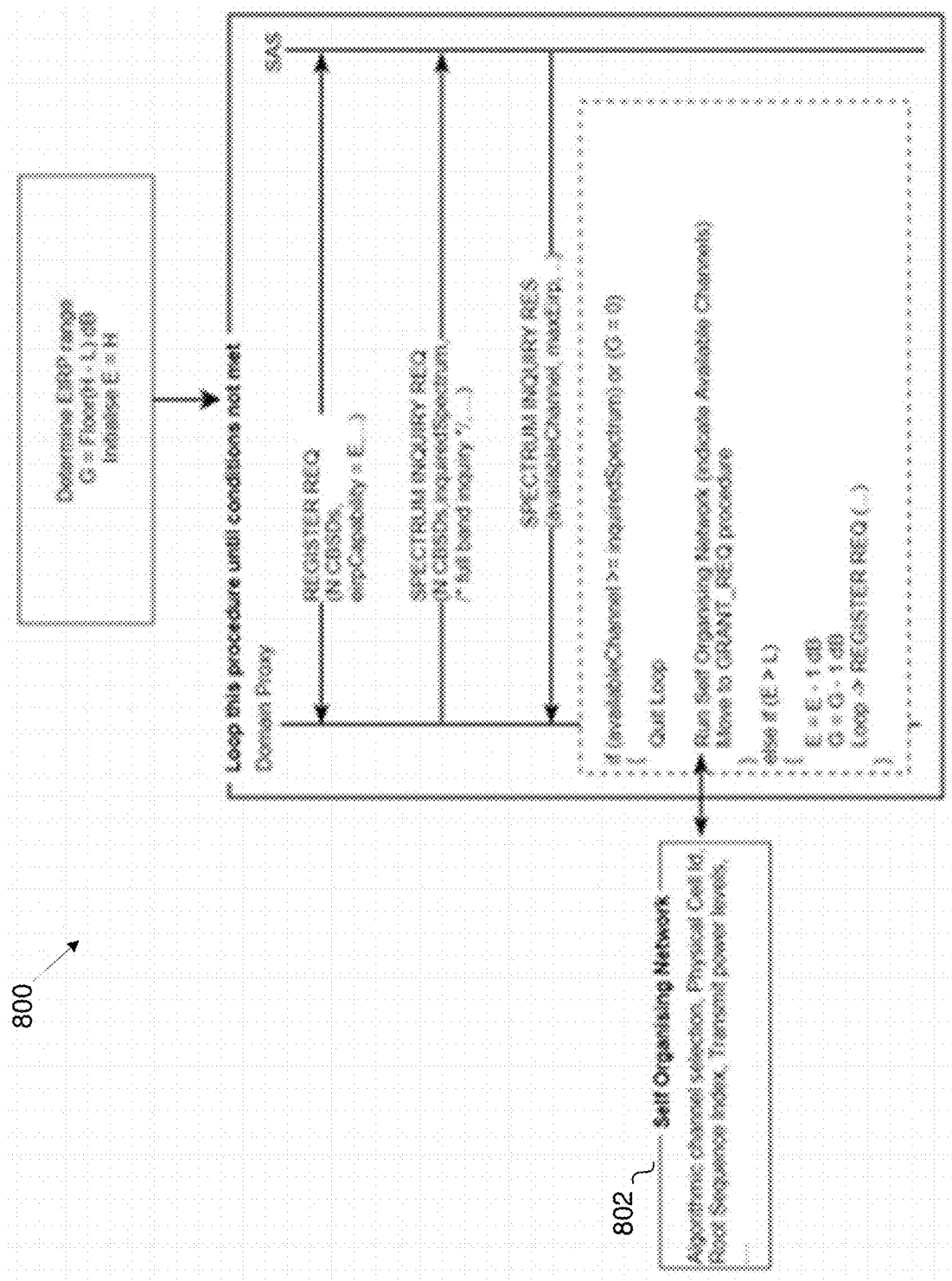
FIG. 8 is a pseudocode diagram showing iterative steps during the registration and spectrum inquiry procedure of the BS/APs in one embodiment of the enterprise network.

FIG. 8 is a pseudocode diagram 800 that shows the iterative steps during the registration and spectrum inquiry procedure for one embodiment. Note that the registration procedure can be invoked several times and per the WInn-Forum specifications, a new registration always overwrites a previous registration in its entirety. Following a registration, as part of the spectrum inquiry procedure, if the indicated availability of spectrum is less than the requested spectrum, then the Domain Proxy reduces the EIRP capability by 1 dB for example and re-registers the enterprise with the same number of BS/APs. This procedure is iterated until either the loop has reached the lowest power (L) or the indicated availability of spectrum matches or exceeds the inquired spectrum. The data from the spectrum inquiries is then sent to a Self-Organizing Network (SON) function 802 residing in the SON Assist Unit 308 (FIG. 3). There is no need to de-register a previous registration since, as explained earlier, the specification states that any new registration with same credentials will overwrite an existing registration in its entirety.

(7) Chart Example

Figure 9:
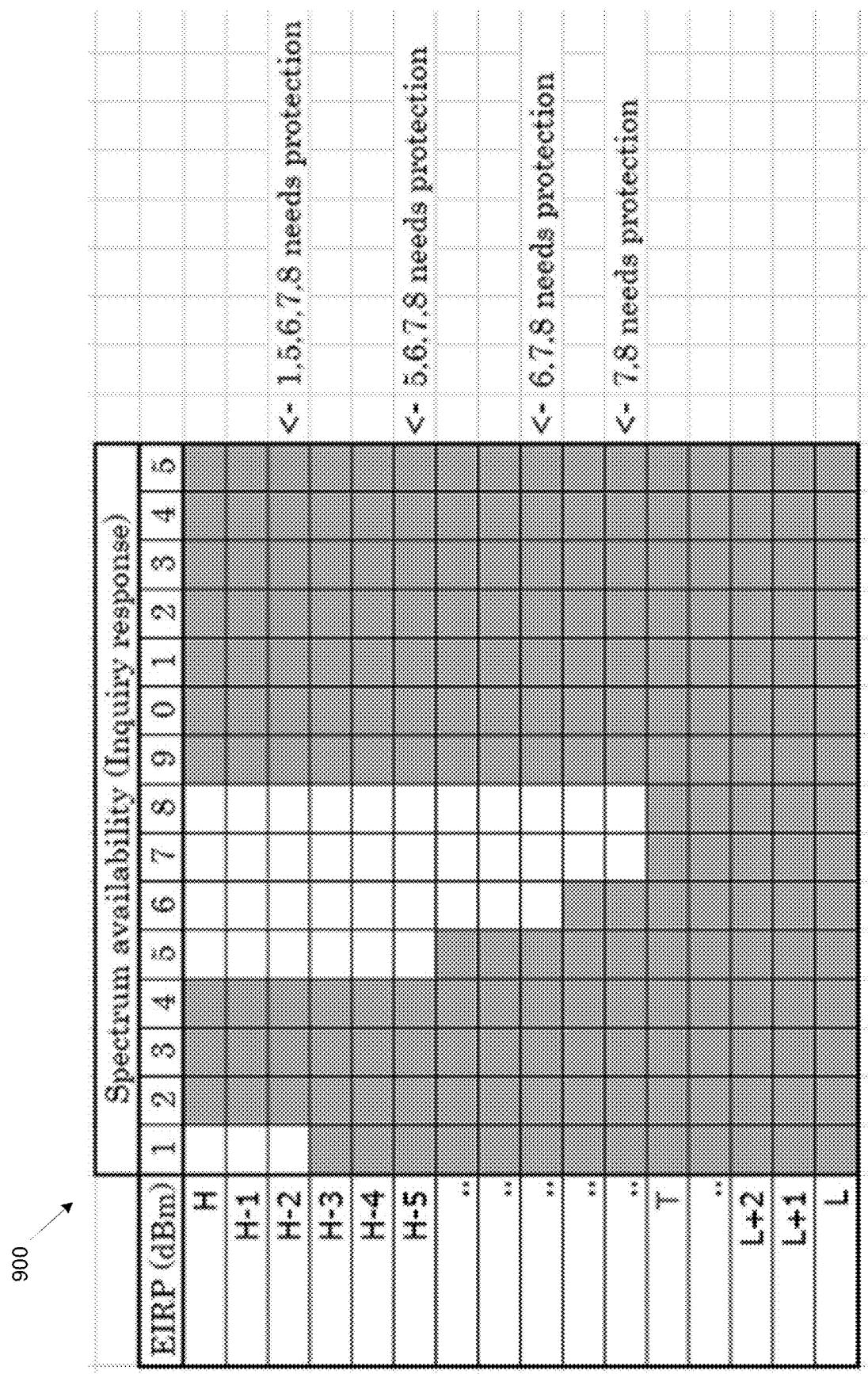
FIG. 9 is a chart showing results of a series of iterations of registrations and spectrum inquires by the Domain Proxy in one example.

Reference is now made to FIG. 9, which is a chart showing results of a series of iterations of registrations and spectrum inquires, in one example. In this example there are 15 channels (15×10 MHz) corresponding to the current CBRS band), for which the Domain Proxy requested spectrum availability. The first row of the chart (below the headings) shows the results of the initial registration and spectrum inquiry. The heading column of the first row indicates the maximum power (H) as the EIRP capability for each of the BS/APs. In this example the indicated availability of spectrum corresponding to (H) shows that channels 2-4, and 9-15 are available; channels 1, and 5-8 are unavailable. We note in this example that as H is decremented by 1 dB (and the Domain Proxy registers again by indicating a lowered EIRP capability), at EIRP capability (H-3) dBm, channel 1 becomes available and the spectrum availability increases by 10 MHz. Therefore we can state that for any EIRP capability ≥(H-2), channels {1, 5, 6, 7, 8} are not available (or) alternatively, for any EIRP ≥(H-2) dBm, channels {1, 5, 6, 7, 8} need protection from SAS's viewpoint. If transmitting just 1 dB below (H-2), SAS deems such protection is unnecessary for channel {1} and thus an availability inclusive of channel #1 is indicated at EIRP capability (H-3) dBm. Similarly, from the same illustration, we note that as we further decrease the EIRP capability in steps of 1 dB, the SAS indicates increased availability of channels at certain discrete values and finally at EIRP capability (T) dBm, the SAS indicates full availability of the spectrum and it can be assumed that all channels are fully available at powers lower than T. At this stage, the iterative loop terminates, and SON algorithms can be invoked. In this example, we exhibit the channel raster as being 10 MHz wide but the raster in use by the SAS can be any value in multiples of 5 MHz. The basic principles detailed above still apply regardless of the channel raster or channel width.

(8) Summary of Advantages

First, we have devised a mechanism that is believed to extract the maximum availability of channels from the SAS for a given geography.

Secondly, we can also infer at this point that (T, shown in FIG. 9) is the optimal transmit power for all the N BS/APs in the enterprise since it maximizes channel availability. It is believed that this advantageously allows more (greater) orthogonality of channels in use between various BS/APs in the enterprise. It also allows interference levels to be kept lower due to the sheer abundance (large amount) of available spectrum.

Note that the actual system bandwidth (BW) in use at the BS/APs can be lower than the channel raster provided by the SAS. For example, in the CBRS example, the SAS indicates channel availability in steps of 10 MHz. SON algorithms in the SON unit 308 (FIG. 3) may further choose to limit system BW per CBSD to 5 MHz, thus effectively doubling the number of channels in use within the enterprise and improving channel orthogonality within the enterprise.

Thirdly, using the methods above, we can infer the EIRP levels at which specific channels become unavailable. Allowing the SON algorithms to perform channel selection with an increased spectrum availability simplifies the SON algorithm and provides better convergence. In exemplary scenario shown in FIG. 9, we note that channels 2, 3, 4, 9, 10, 11, 12, 13, 14, and 15 are much safer than any other channels since they are marked as available even if we transmitted at the highest power (H). Hence, the SON unit can assign "safe" channels for the primary M BS/APs as orthogonally as possible. Further, as much as practicable, the SON unit can assign "safe" channels for the remaining R(=N−M) BS/APs too unless it is not possible (or) not entirely possible. In that situation, a combination of "safe" and "other" channels can be allocated to the remaining R BS/APs. As explained earlier, one algorithm to determine orthogonality between two BS/APs may be to confirm if an edge exists between them (i.e., by looking at REM measurements and/or looking at distance between BS/APs based on GPS location).

(9) Channel Allocation

Referring again to FIG. 7, After the iterative looping is curtailed or completed, the Domain Proxy or a SON unit, or any other appropriate unit, can utilize the spectrum availability data collected in the spectrum inquiry iterative process to determine an optimal channel allocation for the enterprise (STEP 718). For example, the Domain Proxy may invoke SON algorithms in a SON unit (to determine an optimal channel allocation. In this context, an optimal coverage may be a "best fit" placement of the BS/APs, and may assume that each BS/AP is transmitting within its allowed EIRP range.

SON algorithms can make use of the RF terrain that was inferred previously using REM scans and/or GPS information obtained from each of the BS/APs. Particularly, the REM scans may be performed by allowing each BS/AP in the enterprise to transmit to each BS/AP in a round-robin manner one at a time to enable all the other BS/APs in the enterprise an opportunity to listen over the air, and then collect all the data and analyze to assess the RF terrain. Any appropriate method of determining the RF terrain may be used.

Any appropriate SON algorithms may be utilized; several methods can be used to determine the optimal channels for each BS/AP in the enterprise. For example, the SON algorithm may employ graph theory to determine an edge to exist (connection) between two BS/APs if at least one of them "heard" the other over the air during the REM scan phase. A map of the entire enterprise as a graph with edges between certain BS/APs can be formed this way. If an edge exists between two BS/APs, then the ideal channel allocation scheme will ensure those two BS/APs cannot be co-channel (i.e., same channel will not be ideally allocated to two BS/APs that have an edge). SON algorithms may also subsequently determine other radio operational parameters for the enterprise such as PCI, RSI, transmit power etc.

In addition to the above, through the iterative schema described above, the SON can also infer the presence of other BS/APs not belonging to the enterprise in the vicinity. This can be explained using the chart in FIG. 9. Currently, the presence of any CBRS nodes in the vicinity of an enterprise/neighborhood is typically determined by REM scans performed by enterprise BS/APs. These REM scans are autonomously performed or commanded by a network element (e.g., (an Automatic Configuration Server (ACS) 310 or Domain Proxy 309 as shown in FIG. 3). An ACS is designed for automatic and easy setup of BS/APs using the protocol described in the standard TR-069, which enables the operator to centrally manage customer equipment through the global network.

The SME spectrum database 313 may contain useful information about power levels, channels, radio technology, TDD configuration in use in a given geography and hence this information can be shared by the SAS with the Domain Proxy to better examine its environment. To this extent, in a CBRS environment, if enterprise CBSDs cannot perform a REM scan accurately, the Domain Proxy can enquire with the SAS and request information corresponding to a geography by sending ASSISTANCE INFORMATION REQUEST message to request information such as transmit power/MHz of other nodes, antenna azimuth and locations. The Domain Proxy can also share information that its enterprise CBSDs were able to determine via REM scans by sending ASSISTANCE INFORMATION INDICATION. This information can include RSSI levels, RSRP levels, high interference indications on certain sections of the band, utilization rates of the frequency band and/or channels. This information may have been obtained by the Domain Proxy from the CBSDs via REM scans, information exchanged between CBSDs on X2 interface, ANR reports collected by the CBSDs from the various UEs that obtain service. In turn, such information can be sent as ASSISTANCE INFORMATION INDICATION to the SAS on demand, periodically or when an event occurs.

Generally, exchanging such information between the SAS and the Domain Proxy enables better co-existence of CBSDs belonging to multiple/different operators, by avoiding interference from nearby CBSDs. For example, with knowledge of presence of other operator CBSDs, the enterprise can deploy a PAL license at the interior (or) periphery of the enterprise, as appropriate, to protect itself and/or another operator's CBSDs.

As described below, a further advantage of the design methodology described above is that it allows channel reconfiguration and/or rotation of the channels assigned to the CBSDs in the enterprise network without service disruption to the mobiles within the enterprise.

(10) Summary of Spectrum Availability and Allocation

Disclosed herein is an apparatus for determining spectrum availability within a radio band that is managed by a Spectrum Management Entity (SME), and allocating at least one channel to each of a plurality of Base Station/Access Points (BS/APs) located in an area. The area may include an enterprise location of an enterprise network. Each of the BS/APs is capable of transmitting at a maximum Effective Isotropic Radiated Power (EIRP) and a minimum EIRP.

The apparatus comprises a domain proxy connected to the BS/APs and the SME, including a circuit configured to send a registration request for the plurality of the BS/APs to the SME, the registration request indicating to the SME the maximum EIRP for the plurality of BS/APs. a circuit configured to receive a registration message from the SME, a circuit configured to send a spectrum inquiry request to the SME that requests a spectrum within the allowed band, a circuit configured to receive and process a spectrum inquiry response from the SME, that indicates available spectrum and a circuit, responsive to the indicated available spectrum, for iteratively sending a spectrum inquiry request and receiving and processing a spectrum inquiry response responsive until the entire requested spectrum is available.

The apparatus also includes a Self-Organizing Network (SON) device connected to the domain proxy to receive the available spectrum information from the domain proxy, and responsive thereto, allocating the available spectrum to BS/APs.

The domain proxy further comprises a circuit configured to receive allocation data from the SON and responsive thereto, sending a grant request message to the SME.

In some embodiment the SON stores data identifying a primary group of the BS/APs that collectively provide wireless coverage substantially over the entire area. This data may be provided as elsewhere described herein. The SON also further comprises a circuit configured to identify channels in the spectrum inquiry that are available at higher power than other available channels and a circuit configured to allocate the higher power available channels to the primary group of BS/APs.

In some embodiments of the apparatus, the radio band is a Citizen's Broadband Radio Service (CBRS) band, the BS/APs comprise CBRS Devices (CBSDs) that are located at an enterprise location and form part of an enterprise network, the SME comprises an SAS, and the domain proxy is connected to the SAS.

(11) CBSD and SAS Activities During Normal Network Operation

In a CBRS network, the spectrum is managed by an SAS, and accordingly the CBSDs within the CBRS network must follow directions from the SAS. Following are some of the CBSD requirements (from WINNF-TS-0112, R0-DEV-04: CBSD technical operation [Ref-2, 96.39])

"a. All CBSDs must be capable of two-way operation on any authorized frequency assigned by an SAS. Equipment deployed by Grandfathered Wireless Broadband Licensees during their license term will be exempt from this requirement.

b. A CBSD must operate at or below the maximum power level authorized by an SAS, consistent with its FCC equipment authorization, and within geographic areas permitted by an SAS on the channels or frequencies authorized by an SAS.

c. A CBSD must receive and comply with any incoming commands from its associated SAS about any changes to power limits and frequency assignments. A CBSD must cease transmission, move to another frequency range, or change its power level within 60 seconds as instructed by an SAS.

d. A CBSD must report to an SAS regarding received signal strength in its occupied frequencies and adjacent frequencies, received packet error rates or other common standard metrics of interference for itself and associated End User Devices as directed by an SAS [Note: See R2-SGN-01]."

During normal network operation, the CBSDs in a CBRS system are broadcasting and receiving on channels assigned by the SAS. In a typical configuration in which a Domain Proxy is implemented, the Domain Proxy handles all messaging and communications between the CBSDs and the SAS. During normal operation, the SAS and Domain Proxy exchange heartbeat messages so that the SAS can remain informed regarding the channels that are in use within the network. The messaging is performed in accordance with standards, such as those set by the Wireless Innovation Forum (CBRS WInnForumStandards, Document-T-0016, Version 1.2.4, 26 Jun. 2019).

Figure 10:
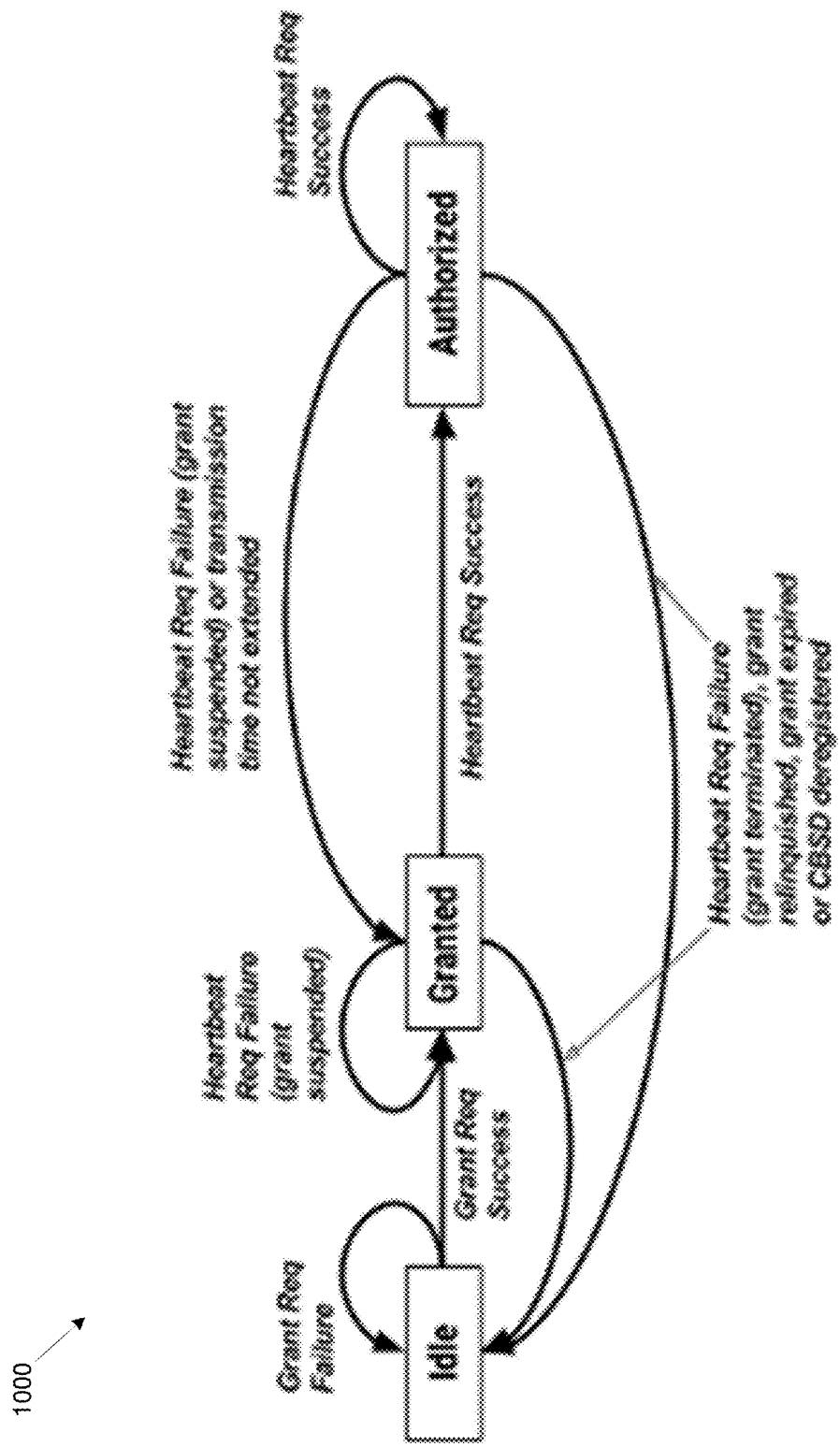
FIG. 10 is a grant state diagram of a CBSD in a CBRS system, showing states and transitions between the Idle state, Granted state, and Authorized states.

FIG. 10 is a grant state diagram 1000 of a CBSD in a CBRS system, showing states and transitions between the Idle state, Granted state, and Authorized state. FIG. 10 is a reproduction of "FIG. 3: Grant State Diagram, CBRS WInnForumStandards, Document-T-0016, Version 1.2.4, 26 Jun. 2019". Following is quoted text from that standard related to Grant State Diagram, which describes these states. Additional details, such as messaging standards, are set forth in that standard document.

"FIG. 3 shows the state transitions of a CBSD Grant. A CBSD in the Registered state can request one or multiple Grants from the SAS. A Grant state machine is in the Idle state if a Grant has not been approved by the SAS. A CBSD can send the SAS a GrantRequest object. If a Grant request is approved, a new Grant is created with operational parameters and a channel allocation. The reception of a successful GrantResponse object causes transition to the Granted state. A CBSD with a Grant that is ready to commence RF transmission commences heartbeat requests associated with the Grant. If a CBSD receives multiple Grants, individual heartbeat requests are sent for each Grant, possibly aggregated in a single transmission to the SAS. If the SAS approves a heartbeat request, the Grant transitions to the Authorized state. In the Authorized state, the CBSD is permitted to commence RF transmission and operate in the CBRS band using the operational parameters specific to that Grant. The Grant transitions from the Authorized state back to the Granted state if the Grant is suspended by the SAS or the transmission right, as defined by the transmitExpireTime parameter in the HeartbeatResponse object, has expired. The Grant state transitions to Idle if a Grant is terminated by the SAS, relinquished by the CBSD, or expired as defined in the grantExpireTime parameter, or the SAS to CBSD connectivity is lost (see Section 8.6)."

As discussed, the Domain Proxy typically handles messaging and communication between the CBSDs and the SAS. The Domain Proxy may be connected to a SON unit, which helps manage network operations, and an ACS unit 310, which manages operations of the CBSDs.

(12) Alternative Embodiment Using an Inner Loop

In this disclosure, dimensioning the enterprise with N CBSDs was described although only a minimum number (M) CBSDs are required. Consequently, up to (R=N−M) supplemental CBSDs are dimensioned. While this dimensioning is still held as the basis, during the "spectrum extraction" procedure between the Domain Proxy and SAS, in an alternative embodiment the Domain Proxy may in addition run an inner-loop of the same procedure several times, decrementing the total number of CBSDs on each look to determine spectrum availability with fewer CBSDs.

This procedure is explained in pseudo code and explained below:
Initialize P=N CBSDs
Start Loop
Step from EIRP=(H) to EIRP=(L) to determine maximum spectrum availability. Determine optimum transmit power (T) among many other methods described elsewhere herein.
P=P−1
If (P<=M) Exit loop
Else Goto Start Loop In this method, we are able to have an inner loop for (M), (M+1), (M+2), (N) CBSDs and the associated channel availability if they were registered as a group of (M), (M+1), (M+2), . . . (N) CBSDs. Based on the maximum extractable spectrum, the algorithms can then determine an optimal number of CBSDs with which to operate; particularly whether to operate with (M) or up to (N) CBSDs. An appropriate unit, such as the ACS, using this number, chooses which CBSDs to operate, and controls the CBSDs so that only that number operates.

(13) Suspension/Termination (ST), Terminating Transmissions on Channel.

As can be seen from the state diagram of FIG. 10, the grant of spectrum can be suspended and/or terminated by the SAS for a number of reasons; the end result of which is that there will be a suspension/termination order that requires transmission to cease on one or more of the channels that the SAS previously authorized. In other words, the now-prohibited channel must be shut down. When a suspension/ termination (ST) order is given, the impacted CBSD is given a short amount of time (60 seconds under the current rules) to shut down any further transmissions on that channel.

In the CBRS system the termination order may be called a "suspension" order or a "termination" order; regardless the result is that communications on the channel must be terminated within a time period. Therefore the term "termination" may be used broadly, and includes what is technically called a suspension or termination order in a CBRS system. Also, in the CBRS system, the external entity controlling the spectrum may be called the SAS or SME, in other contexts, the entity controlling the spectrum may have a different name and may be external or internal to the enterprise wireless network.

During normal operation, it is expected that one or more UEs will be wirelessly connected to each CBSD. Suppose an enterprise as exemplified earlier has commenced operation with up to N CBSDs as shown for example in FIG. 3 or FIG. 11B. To communicate with its respective CBSD, each UE will be transmitting and receiving on the same channel as the CBSD with which it is associated. One consequence of an ST order is that the UEs connected to the impacted CBSDs will in turn be impacted, because the CBSDs and their connected UEs are communicating on the same channel that is being suspended/terminated. As stated above, all communications over the prohibited channel must be shut down in a short time (60 seconds in a CBRS system), and in order to provide a smooth transition for the UEs to another channel and avoid any disruption in communications, a method of handling an ST order is needed.

Figure 11A:
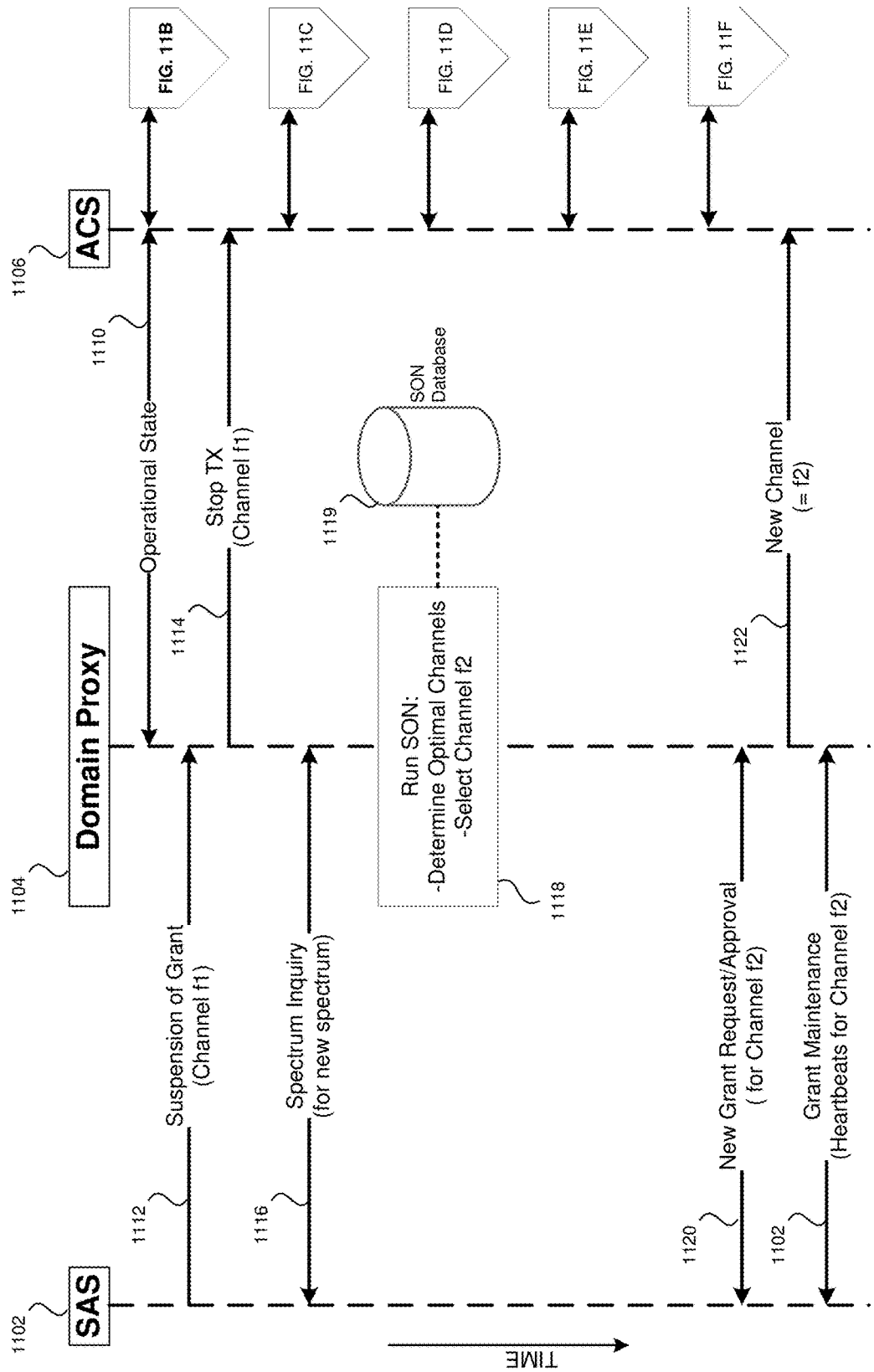
FIG. 11A is a process diagram that shows, over time, a series of messages, actions, and the state of the enterprise network after notification of suspension/termination of a channel.
Figure 11B:
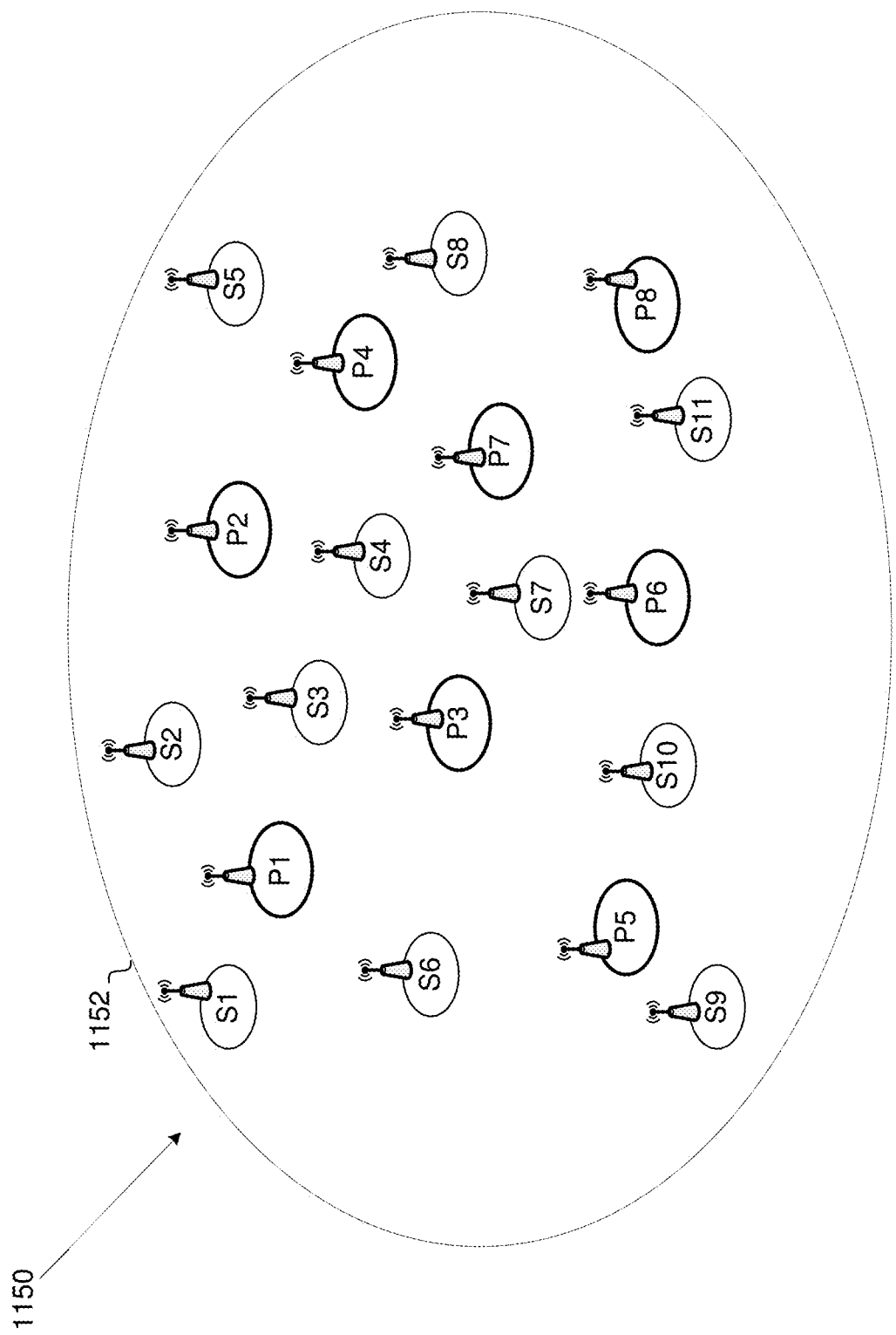
FIG. 11B is an illustration of the BS/APs within an enterprise location, showing all BS/APs in an initial operational state in which the BS/APs have all been assigned channels, and are all in an operational state.
Figure 11C:
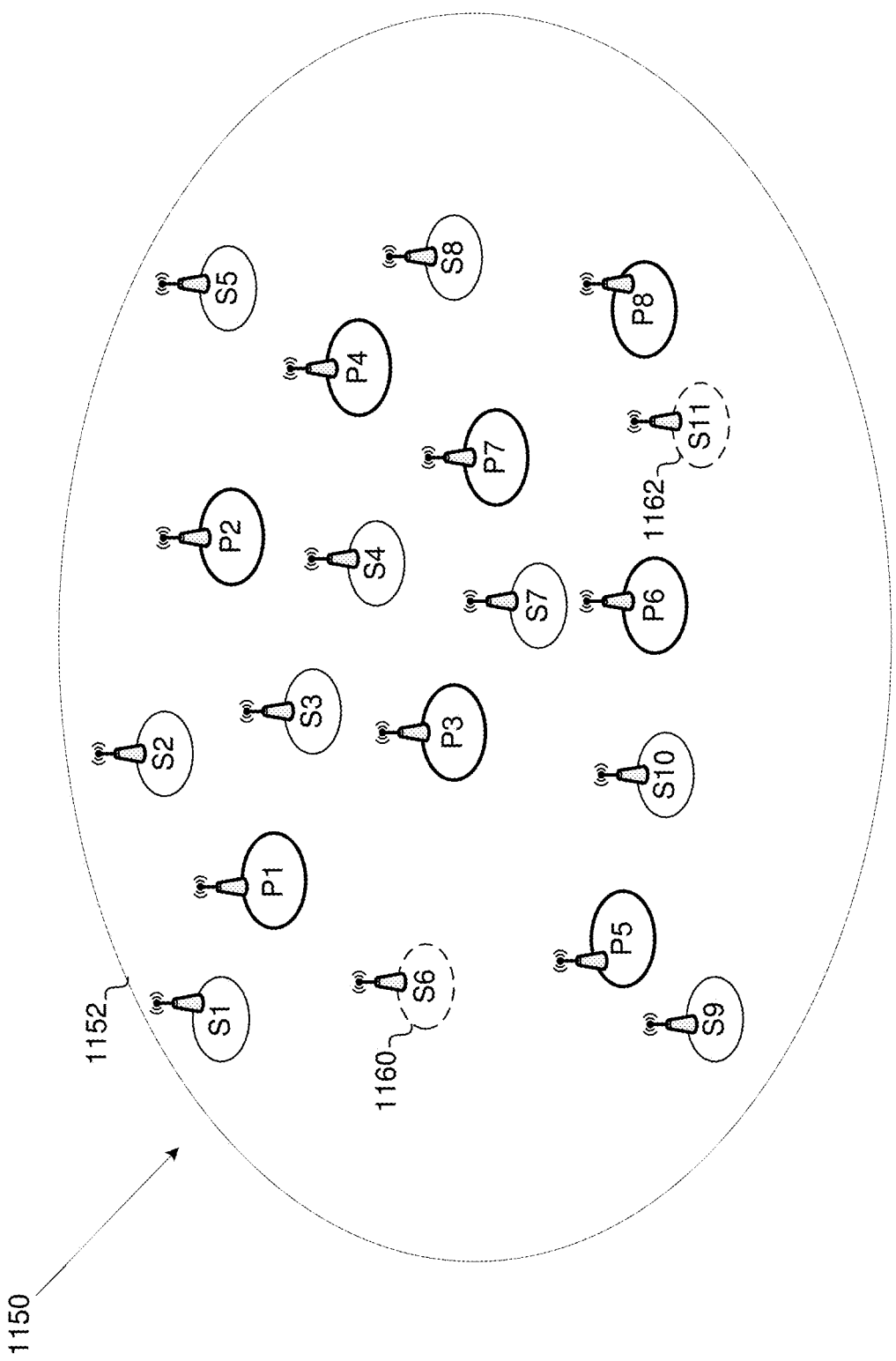
FIG. 11C is an illustration of the BS/APs within an enterprise location after the suspension order has been received, identifying the BS/APs impacted by suspension/termination of the grant of their current channel.

Now suppose the SAS sends a suspend order for one of the channels that is in use within the enterprise (e.g. channel f1), and this impacts two CBSDs, for example the S6 CBSD and the S11 CBSD shown respectively in FIG. 11C at 1160 and 1162.

Specifically speaking, the SAS in the CBRS system sends a suspension order for one or more grants rather than the channel itself. For simplicity, we may indicate that a channel is suspended, meaning one or more grants are suspended, and those grants map to that channel. Per current CBRS regulations, once a suspend/terminate order is issued for a channel (more specifically, a grant ID), the CBSDs must cease transmission on that channel within 60 seconds.

As will be described, a further advantage of the design methodology described herein in which the CBSDs are deployed in a primary and supplemental configuration, is that it facilitates channel reconfiguration and channel rotation within an enterprise network substantially without service disruption to the mobiles (UEs) within the enterprise.

(14) Response to ST Order

The response to the suspension/termination order is described herein in the context of a CBRS system; however it has wide applicability in any wireless multi-channel communication system that may be subject to loss (termination) of a channel due to any of a variety of reasons, and any system that is spectrum-controlled.

In general terms, the response to an ST (termination) order as described herein in the context of a CBRS system, includes: (1) requesting a new grant of spectrum, and receiving a new channel authorization from the SAS; (2) in parallel, ceasing all transmissions on the prohibited channel by gradually reducing the power transmissions of the impacted CBSDs and eventually shutting down the impacted CBSDs; (3) in parallel, designating CBSDs and reconfiguring the network so that the UEs previously connected to the impacted CBSDs are efficiently handed over to the designated CBSDs; (4) assigning the new channel to the impacted CBSDs; and (5) re-introducing the previously-impacted CBSDs to the network using the newly-assigned channel. Each of these general steps will be addressed below, with reference to FIGS. 11A, 11B, 11C, 11D, 11E, and 11F.

Reference is made to FIG. 11A which is a process diagram that shows a series of messages, actions, and the state of the enterprise network as the response to the suspension/termination progresses over time. Particularly, FIG. 11A in connection with FIGS. 11B, 11C, 11D, 11E, and 11F, shows a series of messages and actions between an SAS 1102, a Domain Proxy 1104, an ACS 1106, and a plurality of BS/APs which are shown in related FIGS. 11B, 11C, and 11E.

Figure 11D:
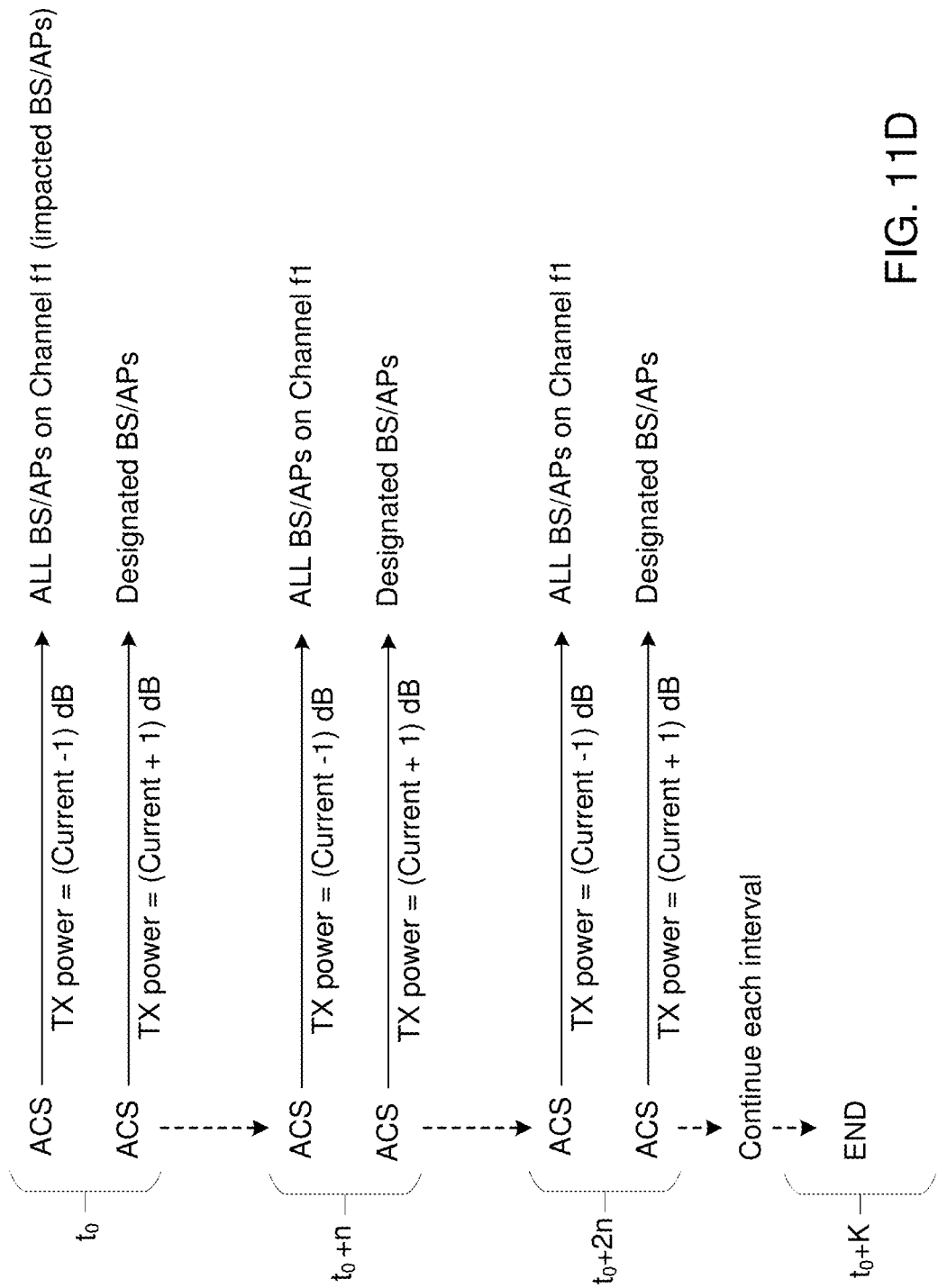
FIG. 11D is a process flow diagram that shows operations to reduce power on the impacted BS/APs and increase power on other, designated BS/APs.
Figure 11E:
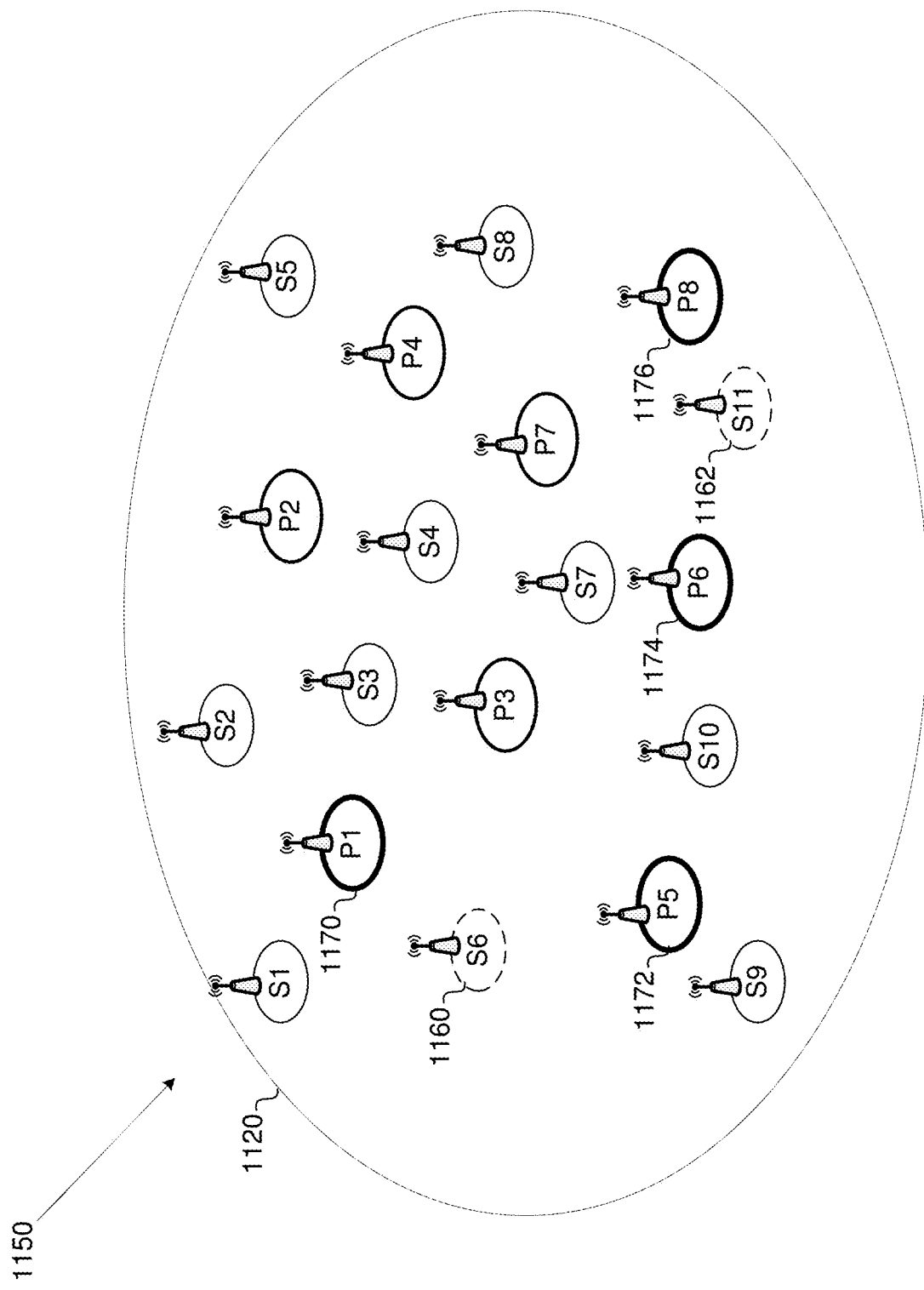
FIG. 11E is an illustration of the BS/APs within an enterprise location after the suspension order has been received, the impacted BS/APs have been identified, and other BS/APs have been identified that can increase power and expand coverage to compensate for the loss in coverage that would otherwise exist when the impacted BS/APs reduce coverage.
Figure 11F:
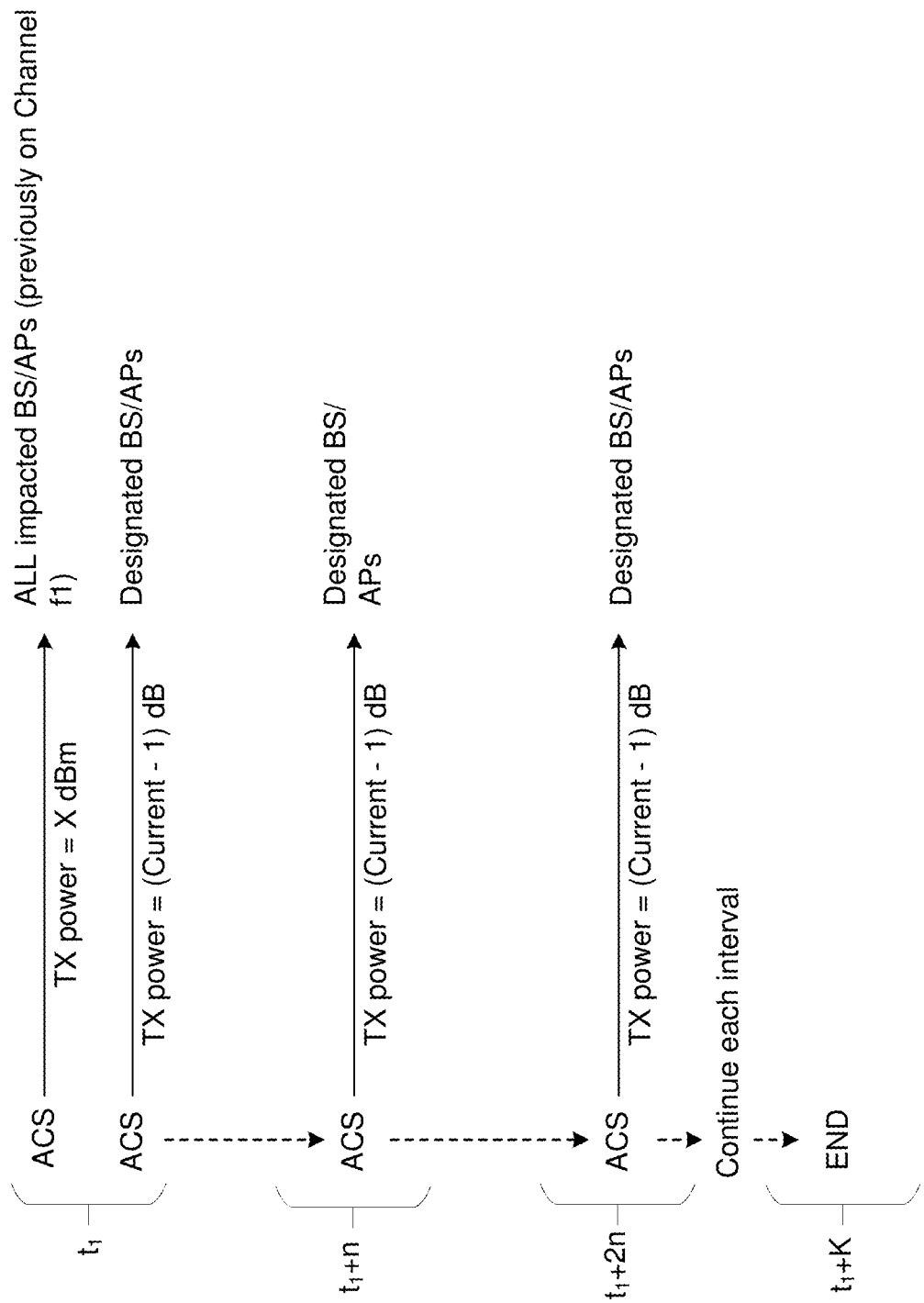
FIG. 11F is a process diagram illustrating the process of re-introducing the previously-impacted BS/APs into the enterprise network over time.

FIG. 11A and its related FIGS. 11D, 11F, also shows a series of actions. FIG. 11A, in connection with FIGS. 11B, 11C, and 11E, shows the state of the BS/APs in the enterprise network.

Referring now to FIG. 11A, an initial operational state 1110 of the BS/APs, known to the Domain Proxy 1104 and the ACS 1106, is shown in the related FIG. 11B. In this state, the BS/APs, shown generally at 1150 in the enterprise location 1152, have all been assigned channels by the ACS, and are all in an operational state and the BS/APs can be connected with UEs within their respective ranges.

Referring back to FIG. 11A, when the Domain Proxy 1104 receives a suspension of grant message 1112 from the SAS 1102, in which a grant for a channel (f1, for example) is suspended, the Domain Proxy invokes two procedures substantially in parallel: (1) as shown at 1112, to command the ACS to shut down transmissions on channel=f1 at all impacted BS/APs, and (2) to obtain a new grant, if possible, for the impacted BS/APs. The Domain Proxy 1104 and the ACS 1106, as two separate units, can perform these two tasks in parallel with each other.

(1) Requesting and receiving a new grant of spectrum from the SAS

As shown in FIG. 11A, after receiving the grant suspension 1112, the Domain Proxy 1104 transmits a stop TX command 1114 to the ACS 1106, and the Domain Proxy 1104 makes a spectrum inquiry 1116 with the SAS 1102 to inquire for new spectrum availability to replace the suspended channel.

After receiving a response of available spectrum, the Domain Proxy 1104 runs the SON unit (as shown at 1118) and determines that a new channel f2 will be used to replace channel f1 for the impacted CBSDs. The SON unit 1118 is connected to a SON database 1119, which stores data and other information that is useful to the SON unit 1118, and accessible to it.

Next, at 1120, the Domain Proxy 1104 applies for a grant of channel f2 for all impacted CBSDs. After the Domain Proxy receives an approval of the grant from the SAS 1106 that identifies the new channel f2 on which the impacted CBSDs are authorized to transmit, at 1122 the Domain Proxy notifies the ACS of the new grant.

(2) in parallel, ceasing all transmissions on the prohibited channel by gradually reducing the power transmissions of the impacted CBSDs and eventually shutting down transmissions on the impacted CBSDs and (3) designating CBSDs and reconfiguring the network so that the UEs previously connected to the impacted CBSDs are efficiently handed over to the designated CBSDs In addition to requesting a new spectrum as described above, the impacted BS/APs are required to stop transmitting. Particularly, in one example, after the Domain Proxy 1104 receives the suspension message 1112, it identifies the channels that have been suspended/terminated (channel f1 in this example) and determines the BS/APs that have been impacted. The Domain Proxy 1104 then sends the Stop TX command 1114 to the ACS 1106, which instructs it to stop all transmit functions on channel f1 and the impacted BS/APs. The ACS 1106 then confirms the identities of the impacted BS/APs.

After the stop TX command 1114 is received by ACS 1106, the ACS will have a limited time (possibly 55-60 seconds) to stop the impacted BS/APs from transmitting. During this time, the ACS attempts a graceful reconfiguration of the enterprise network as will be described.

Reference is now made to FIG. 11C, which shows the state of the BS/APs in the enterprise location 1152 after the suspension order. In this example, two CBSDs 1160 and 1162 have been identified by the Domain Proxy as being impacted by suspension of the grant of their current channel f1. In this example, these two impacted BS/APs are from the group of R supplemental BS/APs, as described elsewhere herein. Note that the BS/APs are labeled to show the two groups described elsewhere: the primary BS/APs are labeled from P1 through P8 (M=8 in this example), and the supplemental B S/APs are labeled from Si through S11 (R=11 in this example).

Generally, the ACS 1106 gradually steps down the transmit power on the impacted CBSDs while simultaneously gradually stepping up the transmit power on designated CBSDs (which is described with reference to FIG. 11E) in order to induce the UEs connected to the impacted BS/APs to handoff to unimpacted BS/APs. The handoff will likely transfer the UEs to one of the designated BS/APs. In one embodiment, the ACS 1106 gracefully steps down the transmit power on the impacted CBSDs each second in steps of 1 dB while simultaneously stepping up the transmit power on designated CBSDs in steps of 1 db. The step-down and step-up commands are shown to be initiated by the ACS at each time interval of 1 second.

To illustrate this, reference is now made to FIG. 11D, which is a process flow diagram that shows operations by the ACS 1106 to reduce power on the impacted BS/APs and increase power on the designated BS/APs. At the initial time to, the ACS instructs all BS/APs on channel f1 (the impacted BS/APs) to reduce power by one increment. At the same time, the ACS instructs the designated BS/APs to increase power by one increment.

In the next time interval $t_0+n$, and all subsequent intervals, the process repeats to gradually decrease the power transmitted by the impacted BS/ASPs and increase the power to the designated BS/APs. The process continues until the available time runs out (for K intervals), or until all UEs have successfully handed off to the designated BS/APs.

In some embodiments, the step-up and step-down intervals may be managed by the BS/APs themselves. In these embodiments the ACS can inform the CBSDs to perform the step-down (or) step-up in certain increments (or) decrements every 1 second (as an example) for K seconds in one singular command. Note here that K is time bound and has an upper limit of approximately 60 seconds. In reality, K is likely to be 10-20 seconds since a corresponding decrease/increase of 10-20 dB at the impacted & designated CBSDs will change the dynamics in the enterprise sufficient enough to coax mobiles to be handed over to the stronger cell (or) reselect to a stronger cell. This way, all the mobiles that are under the impacted CBSDs are gracefully moved to designated CBSDs.

Reference is now made to FIG. 11E to illustrate the designated BS/APs. Generally, the designated BS/APs are chosen by the ACS to expand coverage to compensate for the loss in coverage that would otherwise exist due to the grant suspension. In the example of FIG. 11E, the ACS (or SON) determines that four (4) nearby CBSDs 1170, 1172, 1174, and 1176 are the designated CBSDs, and these are all primary BS/APs. A number of factors may be utilized to determine which BS/APs are designated; one factor is location relative to the impacted BS/APs. Another factor in the designation of BS/APs is their available power; i.e. are they authorized to increase power and by how much. In one embodiment the ACS designates only primary BS/APs, as previously described, which is advantageous because the primary BS/APs were the minimum chosen to provide coverage over the entire enterprise location. The primary BS/APs likely have been transmitting at below their authorized power, and therefore their power can be increased without violating their grant.

Note that the ACS can determine the designated CBSDs by SON functions and this algorithm may be implemented inside any unit (module) in the system, such as in the ACS. Also, in this example, the ACS designates a primary CBSDs (the "designated CBSDs") that will compensate for the radio coverage, which is advantageous.

(4) assigning the new channel to the impacted CBSDs

After the graceful method of reconfiguring the UE(s) is completed (which may be approximately K seconds), the ACS sets the new channel=f2 on the impacted CBSDs and sets the same transmit power as it was previously prior to the impact.

(5) re-introducing the previously-impacted CBSDs to the network using the new channel Reference is now made to FIG. 11F, which is a process diagram illustrating the process of re-introducing the previously-impacted BS/APs into the enterprise network. At an initial time $t_1$, all previously impacted CBSDs can brought up to power on the new channel, and at the same time, since the designated CBSDs had previously been commanded to increase power, the ACS performs the reverse and commands the designated CBSDs to lower the transmit power. In the example of FIG. 11F, the previously impacted BS/APs can bring up their power all the way up to the authorized level of X dBm, at time $t_1$. However, at time $t_1$, the designated CBSDs only start gradually reducing their power. In this example, the designated CBSDs reduce their power in 1 dB steps each second, and this process continues for each n subsequent time interval, until a maximum number is reached, for example K equally spaced intervals, or it is determined that all UEs have been handed over. In this process, the UEs that were previously handed over to the designated CBSDs most likely will be handed back to the CBSD with which they were previously communicating, and normal operation resumes.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of responding to a channel termination order received by a wireless communication network that includes a plurality of Base Stations/Access Points (BS/APs) located within an area, the BS/APs communicating with a plurality of User Equipment devices (UEs) on a plurality of wireless channels, comprising the steps of:
   receiving a termination order that identifies a prohibited channel, thereby requiring the wireless network to terminate communication on the prohibited channel within a time period;
   identifying at least one BS/AP that is communicating on the prohibited channel and therefore is impacted by the channel termination order;
   designating at least one of said BS/APs that is not transmitting on the prohibited channel, and is allowed to increase transmission power;
   gradually reducing the transmission power on said at least one impacted BS/AP during said time period to induce impacted UEs connected to said impacted BS/AP to handoff to a non-impacted BS/AP; and
   gradually increasing the transmission power of said at least one designated BS/AP to receive a handoff from at least one of the impacted UEs;
   wherein at least one impacted UEs previously communicating with said impacted BS/AP changes communication from said impacted BS/AP to said designated BS/AP.

2. The method of claim 1 wherein:
   said step of designating at least one BS/AP that is not transmitting on a prohibited channel further comprises designating at least one of a plurality of primary BS/APs that collectively provides wireless coverage substantially over the entire area, and that are authorized to transmit at higher power than other available channels; and
   said step of gradually increasing the transmission power includes increasing the transmission power of at least one of said primary BS/APs.

3. The method of claim 2, further comprising steps performed subsequent to handoff of the impacted UEs, including the steps of:
   receiving authorization for transmission on a channel, and directing said previously impacted BS/AP to transmit on said authorized channel;
   increasing the transmission power of said authorized channel on said previously impacted BS/AP; and
   gradually decreasing the transmission power of said at least one primary BS/AP;
   thereby inducing impacted UEs to handoff from said primary BS/AP to said previously impacted BS/AP which is now transmitting on said authorized channel.

4. The method of claim 1 further comprising the steps of:
   identifying a plurality of BS/APs that are communicating on the prohibited channel and therefore are impacted by the channel termination order;
   designating a plurality of BS/APs that are not transmitting on the prohibited channel, and are allowed to increase transmission power;
   gradually reducing the transmission power on said plurality of BS/APs during said time period; and
   gradually increasing the transmission power of said designated BS/APs to receive a handoff from a plurality of impacted UEs;
   wherein impacted UEs previously communicating with said impacted BS/APs can change communication from the impacted BS/APs to said designated BS/APs.

5. The method of claim 1 wherein the wireless network operates on the Citizen's Broadband Radio Service (CBRS band), the BS/APs comprise CBRS Devices (CBSDs) that are located at an enterprise location and form part of an enterprise network, a Spectrum Access System (SAS) provides the channel termination order, and the channel termination order is one of a suspension order and a termination order.

6. The method of claim 1 wherein the impacted BS/AP ceases transmission on the prohibited channel within the time period.

7. The method of claim 6 wherein the time period is predetermined, and at least one of the UEs previously connected to the impacted BS/AP transfer communications to the designated BS/AP during the predetermined time period, substantially without interruption in service.

8. A method of responding to a Suspension/Termination (ST) order sent from a Spectrum Access System (SAS) to a wireless network operating in the Citizen's Broadband Radio System (CBRS) radio band, the wireless network including a plurality of CBRS Devices (CBSDs) located within an area, said plurality of CBSDs transmitting on a plurality of wireless channels and communicating wirelessly with a plurality of User Equipment devices (UEs) over the plurality of wireless channels, comprising the steps of:
receiving the ST order from the SAS that requires the wireless network to suspend/terminate communication on at least one of said wireless channels within a time period;
identifying at least one of said CBSDs that is communicating on the prohibited ST channel and is therefore impacted by the ST order;
designating at least one of said CBSDs that is not transmitting on the prohibited ST channel, and is allowed to increase transmission power;
gradually reducing the transmission power on said impacted CBSD during said time period to induce impacted UEs connected to said impacted CBSD to handoff to a non-impacted CBSD; and
gradually increasing the transmission power of said at least one designated CBSD that is not transmitting on the prohibited ST channel to receive a handoff from at least one of the impacted UEs;
thereby transferring communications with at least one impacted UE from the impacted CBSD to the designated CBSD.

9. The method of claim 8 wherein:
said step of identifying at least one CBSD that is not transmitting on a prohibited ST channel further comprises identifying primary CBSDs that collectively provide wireless coverage substantially over the entire area, and that are authorized to transmit at higher power than other available channels; and
said step of gradually increasing the transmission power includes increasing the transmission power of at least one of said primary CBSDs.

10. The method of claim 9, further comprising steps performed subsequent to handoff of impacted UEs, including the steps of:
receiving authorization from the SAS for transmission on a channel, and directing said previously impacted CBSD to transmit on said authorized channel;
increasing the transmission power of said authorized channel on said previously impacted CBSD; and
gradually decreasing the transmission power of said at least one primary CBSD,
thereby inducing UEs to handoff from said primary CBSD to said previously impacted CBSD which is now transmitting on said authorized channel.

11. The method of claim 8 wherein the CBSDs comprise CBSDs that are located at an enterprise location and form part of an enterprise network, and a domain proxy communicates with the SAS and the CBSDs.

12. The method of claim 8 further comprising the steps of:
identifying a plurality of CBSDs that are communicating on the prohibited channel and therefore are impacted by the channel termination order;
designating a plurality of CBSDs that are not transmitting on the prohibited channel, and are allowed to increase transmission power;
gradually reducing the transmission power on said plurality of CBSDs during said time period; and
gradually increasing the transmission power of said designated CBSDs to receive a handoff from a plurality of impacted UEs;
wherein impacted UEs previously communicating with said impacted CBSDs can change communication from the impacted CBSDs to said designated CBSDs.

13. An apparatus in a wireless communication network for handling a channel termination order received from a spectrum access system (SAS), the wireless communication network including a plurality of Base Stations/Access Points (BS/APs) located within an area, the BS/APs communicating with a plurality of User Equipment devices (UEs) on a plurality of wireless channels, the channel termination order identifying a prohibited channel and requiring the wireless network to terminate communication on the prohibited channel within a time period, comprising:
a domain proxy connected to the SAS and the BS/APs, the domain proxy configured to communicate with the SAS and the BS/APs, and receive the channel termination order;
an Automatic Configuration Server (ACS) connected to the domain proxy and the BS/APs, the ACS configured to manage operations of the BS/APs, the ACS also configured to:
identify at least one BS/AP that is communicating on the prohibited channel and therefore is impacted by the channel termination order;
designate at least one of said BS/APs that is not transmitting on the prohibited channel, and is allowed to increase transmission power;
gradually reduce the transmission power on said at least one impacted BS/AP during said time period to induce impacted UEs connected to said impacted BS/AP to handoff to a non-impacted BS/AP; and
gradually increase the transmission power of said at least one designated BS/AP to receive a handoff from at least one of the impacted UEs so that during the time period the impacted UEs previously communicating with said impacted BS/AP can change communication from said impacted BS/AP to said designated BS/AP.

14. The apparatus of claim 13 wherein the BS/APs are positioned within an area, and further comprising:
a Self-Organizing Network unit connected to the domain proxy, ACS and BS/APs, said SON configured to define a plurality of primary BS/APs that collectively provide wireless coverage substantially over the entire area, and that are authorized to transmit at higher power than other available channels; and said ACS is configured to designate at least one of said primary BS/APs to gradually increase the transmission power on a non-impacted channel.

15. The apparatus of claim 14, wherein:

the domain proxy is configured to receive authorization for transmission on a channel, the ACS configured, subsequent to handoff of impacted UEs, to direct said previously impacted BS/AP to transmit on said authorized channel and increase the transmission power of said authorized channel, and to direct said primary BS/AP to decrease transmission power, to induce UEs to handoff from said primary BS/AP to said previously impacted BS/AP which is currently transmitting on said authorized channel.

16. The apparatus of claim 13 wherein the ACS is further configured to:

identify a plurality of BS/APs that are communicating on the prohibited channel and therefore are impacted by the channel termination order;

designate a plurality of BS/APs that are not transmitting on the prohibited channel, and are allowed to increase transmission power;

gradually reduce the transmission power on said plurality of BS/APs during said time period; and gradually increase the transmission power of said designated BS/APs to receive a handoff from a plurality of impacted UEs.

17. The apparatus of claim 13 wherein the wireless network is configured to operate in on the Citizen's Broadband Radio Service (CBRS) radio band, the BS/APs comprise CBRS Devices (CBSDs) that are located at an enterprise location and form part of an enterprise network.

18. The wireless communication network of claim 13 wherein said area comprises a floor space within an enterprise location, the BS/APs define at least part of an enterprise network, and said BS/APs are installed within the floor space.

* * * * *